US011235282B2

(12) United States Patent
Harrison et al.

(10) Patent No.: US 11,235,282 B2
(45) Date of Patent: Feb. 1, 2022

(54) PROCESSES FOR PRODUCING LITHIUM COMPOUNDS USING FORWARD OSMOSIS

(71) Applicant: TERRALITHIUM LLC, Houston, TX (US)

(72) Inventors: Stephen Harrison, Benicia, CA (US); Dennis L. Howe, The Woodlands, TX (US); Brian J. Dougherty, Emeryville, CA (US)

(73) Assignee: Terralithium LLC, Houston, TX (US)

( * ) Notice: Subject to any disclaimer, the term of this patent is extended or adjusted under 35 U.S.C. 154(b) by 0 days.

(21) Appl. No.: 16/688,967

(22) Filed: Nov. 19, 2019

(65) Prior Publication Data

US 2020/0086271 A1    Mar. 19, 2020

Related U.S. Application Data

(63) Continuation-in-part of application No. 16/297,476, filed on Mar. 8, 2019.
(Continued)

(51) Int. Cl.
| | | |
|---|---|---|
| *B01D 61/00* | (2006.01) | |
| *B01D 15/08* | (2006.01) | |
| *C01D 15/00* | (2006.01) | |

(52) U.S. Cl.
CPC ........... *B01D 61/005* (2013.01); *B01D 15/08* (2013.01); *C01D 15/00* (2013.01); *B01D 2313/90* (2013.01)

(58) Field of Classification Search
CPC ....... B01D 61/005; B01D 15/08; C01D 15/00
(Continued)

(56) References Cited

U.S. PATENT DOCUMENTS

| | | |
|---|---|---|
| 4,016,075 A | 4/1977 | Wilkins |
| 4,116,856 A | 9/1978 | Lee et al. |

(Continued)

FOREIGN PATENT DOCUMENTS

| | | | |
|---|---|---|---|
| JP | 3691027 | 6/2005 | |
| WO | WO-2015096549 A1 * | 7/2015 | ............ C01D 15/00 |

(Continued)

OTHER PUBLICATIONS

Iron (III) Hydroxide CAS Registry Information, 2019, 1 page.
(Continued)

*Primary Examiner* — Melissa S Swain
(74) *Attorney, Agent, or Firm* — Kilpatrick Townsend & Stockton, LLP

(57) ABSTRACT

Systems, methods and apparatuses to concentrate lithium containing solutions using forward osmosis units are provided, which, for example, can include providing at least one forward osmosis unit having at least one lithium containing solution chamber having at least one first inlet and at least one first outlet, at least one brine chamber having at least one second inlet and at least one second outlet, and at least one selectively permeable membrane positioned between the at least one lithium containing solution chamber and the at least one brine chamber, and conveying a lithium containing solution through the at least one lithium containing solution chamber and a concentrated brine solution through the at least one brine chamber, said conveying causing water from the lithium containing solution to be drawn through the at least one selectively permeable membrane and into the concentrated brine solution, such that a concentrated lithium containing solution exits through the first outlet and a less concentrated brine solution exits through the second outlet.

9 Claims, 15 Drawing Sheets

Related U.S. Application Data

(60) Provisional application No. 62/769,266, filed on Nov. 19, 2018, provisional application No. 62/640,898, filed on Mar. 9, 2018.

(58) Field of Classification Search
USPC .......................................................... 423/179.5
See application file for complete search history.

(56) References Cited

U.S. PATENT DOCUMENTS

| | | |
|---|---|---|
| 4,116,858 A | 9/1978 | Lee et al. |
| 4,159,311 A | 6/1979 | Lee et al. |
| 4,221,767 A | 9/1980 | Lee et al. |
| 4,276,180 A | 6/1981 | Matson |
| 4,291,001 A | 9/1981 | Repsher et al. |
| 4,347,327 A | 8/1982 | Lee et al. |
| 4,348,295 A | 9/1982 | Burba, III |
| 4,348,296 A | 9/1982 | Bauman et al. |
| 4,348,297 A | 9/1982 | Bauman et al. |
| 4,376,100 A | 3/1983 | Lee et al. |
| 4,405,463 A | 9/1983 | Jost et al. |
| 4,430,311 A | 2/1984 | Lee et al. |
| 4,461,714 A | 7/1984 | Burba, III |
| 4,472,362 A | 9/1984 | Burba, III |
| 4,540,509 A | 9/1985 | Burba, III |
| 4,727,167 A | 2/1988 | Burba, III et al. |
| 4,920,588 A | 5/1990 | Watkins |
| 5,254,225 A | 10/1993 | Gallup |
| 5,358,700 A | 10/1994 | Brown et al. |
| 5,389,349 A | 2/1995 | Bauman et al. |
| 5,599,516 A | 2/1997 | Bauman et al. |
| 5,656,172 A | 8/1997 | Kitz et al. |
| 5,681,477 A | 10/1997 | Leavitt |
| 6,017,500 A | 1/2000 | Mehta |
| 6,280,693 B1 | 8/2001 | Bauman et al. |
| 6,458,184 B2 | 10/2002 | Featherstone |
| 6,517,701 B1 | 2/2003 | Geisler |
| 6,555,078 B1 | 4/2003 | Mehta |
| 8,454,816 B2 | 6/2013 | Harrison et al. |
| 8,518,232 B1 | 8/2013 | Harrison et al. |
| 8,753,594 B1 | 6/2014 | Burba, III et al. |
| 9,051,827 B1 | 6/2015 | Harrison |
| 9,238,851 B1 | 1/2016 | Harrison et al. |
| 9,532,276 B1 | 12/2016 | Malhotra et al. |
| 9,644,126 B2 | 5/2017 | Harrison et al. |
| 9,644,866 B2 | 5/2017 | Harrison et al. |
| 9,650,555 B2 | 5/2017 | Harrison et al. |
| 10,190,030 B2 | 1/2019 | Harrison et al. |
| 2001/0000597 A1 | 5/2001 | Featherstone |
| 2001/0011645 A1 | 8/2001 | Silva et al. |
| 2003/0026749 A1 | 2/2003 | Burrows et al. |
| 2003/0226761 A1 | 12/2003 | Featherstone et al. |
| 2012/0267307 A1 | 10/2012 | McGinnis |
| 2014/0165563 A1 | 6/2014 | Harrison et al. |
| 2014/0170041 A1 | 6/2014 | Harrison et al. |
| 2014/0174745 A1 | 6/2014 | Harrison et al. |
| 2014/0231041 A1 | 8/2014 | Harrison et al. |

FOREIGN PATENT DOCUMENTS

| | | | | |
|---|---|---|---|---|
| WO | WO-2016064689 A2 * | 4/2016 | .......... | B01D 69/125 |
| WO | 2017039724 | 3/2017 | | |
| WO | WO-2017039724 A1 * | 3/2017 | .......... | B01J 20/3085 |

OTHER PUBLICATIONS

Iron (III) Oxyhydroxide CAS Registry Information, 2019, 2 pages.
Stefan Socratic Q&A, Chemistry Topics, Jun. 26, 2020, 2015.
Volume I in the Videoconference Deposition of Darrell L. Gallup, Ph.D., May 18, 2020, 193 pages.
Volume II in the Videoconference Deposition of Darrell L. Gallup, Ph.D., May 19, 2020, 159 pages.
U.S. Appl. No. 16/297,476, Non-Final Office Action dated Jun. 26, 2020, 31 pages.
Berthold, Magmamax No. 1 Geothermal Brine Bulk Solids Precipitation Pilot Plant: Engineering Design, U.S. Bureau of Mines, Geothermal Minerals Group, Reno Metallurgy Research Center; Hazen Research, Inc., 1978.
Bourcier et al., Recovery of Minerals and Metals from Geothermal Fluids, SME Annual Meeting, Sep. 8, 2005, 19 pages.
Christopher et al., The Recovery and Separation of Mineral Values from Geothermal Brines, Hazen Research Inc., Jun. 12, 1975, 43 pages.
Maimoni, A Cementation Process for Minerals Recovery from Salton Sea Geothermal Brines, Lawrence Livermore Laboratory, Jan. 26, 1982, 26 pages.
U.S. Appl. No. 16/297,476, Final Office Action, dated Mar. 4, 2021, 14 pages.
U.S. Appl. No. 16/297,476, Notice of Allowance, dated Jul. 13, 2021, 9 pages.

* cited by examiner

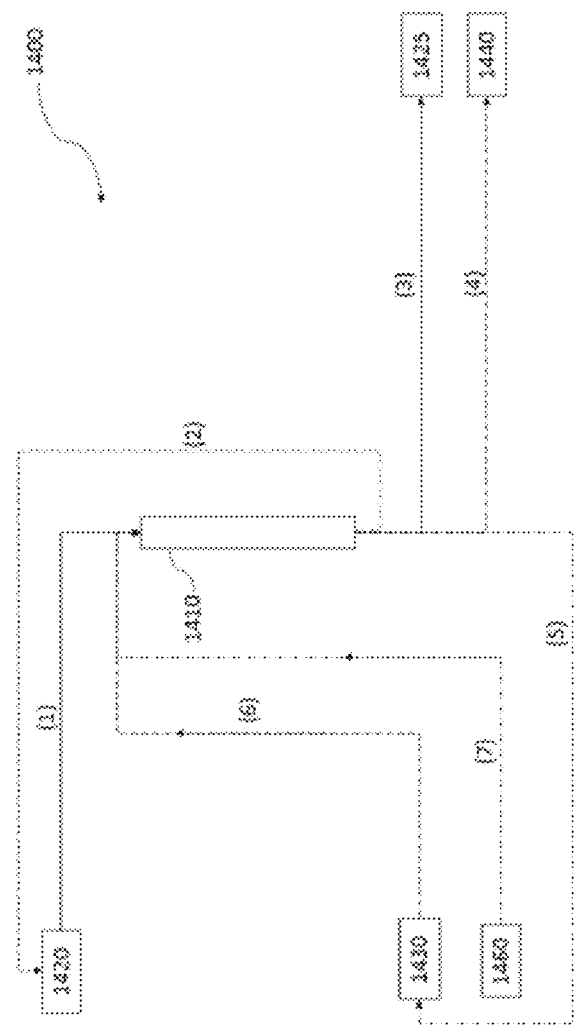

PROCESSES FOR PRODUCING LITHIUM COMPOUNDS USING FORWARD OSMOSIS

CROSS-REFERENCE TO RELATED APPLICATION

This application claims priority to U.S. Provisional Application 62/769,266, filed on Nov. 19, 2018, and U.S. patent application Ser. No. 16/297,476, filed on Mar. 8, 2019, which claims priority to U.S. Provisional Application 62/640,898, filed on Mar. 9, 2018, the entire contents and disclosure of each of the applications are incorporated herein for all intents and purpose.

FIELD OF THE INVENTION

The present disclosure relates to the extraction and concentrating of lithium containing solutions, and in particular to concentrating lithium chloride brines by forward osmosis.

BACKGROUND OF THE INVENTION

Brine sources exist naturally, for instance, brine sources include brine deposits like the Salar de Atacama in Chile, Silver Peak Nev., Salar de Uyuni in Bolivia, or the Salar de Hombre Muerte in Argentina. The term "brines" is used in the broad sense and includes, in addition to geothermal brines, brines obtained as waste or by-product steams characteristic of industrial processes. Other common brine sources are geothermal, oilfield, smackover, and relict hydrothermal brines. Lithium-enriched brines can also be found in some deep oil reservoirs. These brines, however, have not previously been commercially exploited.

Geothermal brines are of particular interest for a variety of reasons. First, geothermal brines provide a source of power due to the fact that hot geothermal pools are stored underground at high pressure, which when released to atmospheric pressure, can provide a flash-steam. The flash-steam can be used, for example, to run a power plant. Additionally, geothermal brines typically contain various useful metals, such as lithium, lead, manganese, silver, and zinc, each of which can be recovered from the brine for further use. These various metal ions, particularly alkali and alkaline earth metals, as well as silica, iron, lead, silver, zinc, and manganese, are present in varying concentrations, depending upon the source of the brine. Recovery of these metals is potentially important to the chemical, pharmaceutical, and electronics industries. Typically, the economic recovery of desired metals from natural brines, which may vary widely in composition, depends not only on the specific concentration of the desired metal, but also upon the concentrations of interfering ions, particularly silica, calcium and magnesium, because the presence of the interfering ions will increase recovery costs as additional steps must be taken to remove the interfering ions, before the desired metals are recovered.

Lithium may also be recovered from ores, as the ore may be roasted with sulfuric acid, and the product leached with water. The resulting lithium sulfate solution is treated with lime and soda ash to remove calcium and magnesium, and lithium is then precipitated as a carbonate. Other known methods for recovering lithium from ores include alkaline methods and ion-exchange methods, each of which can yield solutions of lithium as hydroxide, chloride or sulfate. These methods may also include the removal of calcium and magnesium by treatment with lime and soda ash. Generally, lithium extraction from brine sources has proven more economical than production from hard-rock ore.

Typically, the economic recovery of lithium from natural, predominantly chloride, brines (which may vary widely in composition), depends not only on the overall lithium content, but also upon the concentrations of interfering ions, particularly calcium and magnesium, which can greatly affect the performance and economics of the lithium recovery. Product solutions from lithium extraction processes tend to have very low concentrations of lithium. Conventional techniques to concentrate the lithium-containing solutions have generally involved evaporation with steam or solar energy. Concentrating the solutions by evaporation requires relatively large capital investment and high operating costs due to steam requirements. Concentrating the solutions by forward osmosis requires high pressure and high energy requirement, and may also cause serious issues with membrane fouling. The size and operating costs of conventional evaporation, and the physical and chemical limits of forward osmosis, prompted a search for alternatives.

SUMMARY OF THE INVENTION

In some embodiments, the present disclosure relates to systems, devices, and methods for isolation and concentration of lithium from various sources. In some embodiments, a lithium containing solution (e.g., from a geothermal brine) is pretreated to reduce or eliminate silica and then further processed to render the solution suitable for concentration by forward osmosis. In other embodiments, the processing utilizes a lithium-specific sorbent that preferentially binds lithium, and particular loading, recycling, and elution profiles are employed to significantly and specifically enrich lithium ions over other ions (e.g., sodium, calcium, manganese, etc.). The osmotic pressure in the obtained solutions is almost entirely a function of lithium ion concentration, and lithium can be further processed in various manners to lithium hydroxide or lithium carbonate.

The present disclosure recognizes the importance of concentrating lithium containing solutions during the recovery of lithium from a variety of brine sources. Various embodiments of methods and apparatuses for concentrating lithium containing solutions are provided herein. Some embodiments of the present disclosure include methods of concentrating lithium chloride containing solutions during the process of lithium extraction from brines. Other embodiments of the present disclosure include methods of concentrating lithium chloride containing solutions by removing water, and also concentrating other metal salt solutions like manganese, zinc, and other metals to facilitate their recovery from brines.

In other embodiments, a method of extracting lithium from a lithium containing solution includes: supplying a lithium containing solution to a lithium capture step, the lithium capture step being operable to capture lithium from the lithium salt containing solution; recovering lithium from the lithium capture step to produce a lithium rich stream; optionally purifying the lithium rich stream to remove divalent ions and borate ions; and concentrating the lithium rich stream by supplying the lithium rich stream to a forward osmosis step to produce a concentrated lithium rich stream.

In yet another embodiment, a method of extracting lithium from a lithium containing solution, includes: supplying a lithium containing solution to a lithium capture step, the lithium capture step being operable to capture lithium from the lithium salt containing solution; recovering lithium from the lithium capture step to produce a lithium rich stream; purifying the lithium rich stream to remove divalent ions and borate ions; concentrating the lithium rich stream by supplying the lithium rich stream to a forward osmosis step to produce a concentrated lithium rich stream; purifying the concentrated lithium rich stream by removing sodium and potassium ions to produce a concentrated lithium rich stream having reduced sodium and potassium ion concentrations.

In some embodiments, a method of extracting lithium from a lithium containing solution, includes: supplying a lithium and silica containing solution to a silica management process to produce a silica lean lithium containing solution; supplying the silica lean lithium containing solution to a lithium capture step, the lithium capture step being operable to capture lithium from the lithium salt containing solution, and where at least a portion of eluate obtained from a sorbent in the lithium capture step is recycled to the sorbent to increase a ratio of lithium to sodium in a lithium rich stream; recovering lithium from the lithium capture step to produce the lithium rich stream; purifying the lithium rich stream to remove divalent ions and borate ions; concentrating the lithium rich stream by supplying the lithium rich stream to a forward osmosis step to produce a concentrated lithium rich stream; further concentrating the concentrated lithium rich stream to produce a twice concentrated lithium rich stream; and purifying the twice concentrated lithium rich stream by removing sodium and potassium ions to produce a concentrated lithium rich stream having reduced sodium and potassium ion concentrations.

In some embodiments, the present disclosure is related to methods of increasing lithium concentration in a lithium containing solution. In some embodiments, the method includes providing at least one forward osmosis unit, that has (i) at least one lithium containing solution chamber having at least one first inlet and at least one first outlet, (ii) at least one brine chamber having at least one second inlet and at least one second outlet; and (iii) at least one selectively permeable membrane positioned between the at least one lithium containing solution chamber and the at least one brine chamber; and conveying a lithium containing solution through the at least one lithium containing solution chamber and a concentrated brine solution through the at least one brine chamber. Conveying the solutions through the two chambers causes water from the lithium containing solution to be drawn through the at least one selectively permeable membrane and into the concentrated brine solution. A concentrated lithium-containing solution exits through the first outlet and a less concentrated brine solution exits through the second outlet. In certain embodiments, the method further includes a step of supplying the concentrated lithium containing solution exiting the at least one first outlet to a lithium extraction step. In certain embodiments, the method further includes a step of supplying the less concentrated brine solution exiting the at least one second outlet to a recycling unit.

In some embodiments, the concentrated lithium containing solution exiting the at least one first outlet has a concentration of lithium chloride of at least about 15 weight % of the total concentrated lithium containing solution. In certain embodiments, the concentrated lithium containing solution exiting the at least one first outlet has a concentration of lithium chloride of at least about 10 weight % of the total concentrated lithium containing solution. In certain embodiments, the concentrated lithium containing solution exiting the at least one first outlet has a concentration of lithium chloride of at least about 20 weight % of the total concentrated lithium containing solution.

Exemplary embodiments of the present disclosure include systems of increasing lithium concentration in a lithium containing solution using a forward osmosis unit. In some embodiments, the system includes a lithium containing solution, said lithium containing solution derived from a geothermal brine; a concentrated brine solution, and at least one forward osmosis unit having at least one first input stream of the lithium containing solution and at least one first output stream of concentrated lithium containing solution and configured to increase the lithium concentration in the lithium containing solution; and at least one second input stream of the concentrated brine solution and at least one second output stream of less concentrated brine solution.

In some embodiments, a lithium containing solution is pretreated to reduce or eliminate silica and then further processed to recover lithium from the lithium containing solution via the use of a sorbent or some other ion selective means such as ion exchange or solvent extraction and once recovered from the ion selective material render the solution suitable for further concentration by forward osmosis. Exemplary embodiments of the present disclosure include systems of increasing lithium concentration in a lithium containing solution using a forward osmosis unit after a pretreatment step to remove silica from the lithium containing solution. In some embodiments, the system includes a lithium containing solution, said lithium containing solution derived from a geothermal or other lithium containing brine; a silica management unit to produce a lithium containing solution that is free of silica and thus rendering the brine suitable to extract lithium from the brine and then be further concentrated lithium containing solution, and at least one forward osmosis unit having at least one first input stream of the lithium containing solution and at least one first output stream of concentrated lithium containing solution and configured to increase the lithium concentration.

In some embodiments, a method of preparing concentrated lithium solutions from a lithium containing solution, includes: supplying a lithium and silica containing solution to a silica management process to produce a silica lean lithium containing solution; supplying the silica lean lithium containing solution to a lithium capture step, the lithium capture step being operable to capture lithium from the lithium salt containing solution; recovering lithium from the lithium capture step to produce the lithium rich stream; purifying the lithium rich stream to remove divalent ions and borate ions; concentrating the lithium rich stream by supplying the lithium rich stream to a forward osmosis step to produce a concentrated lithium rich stream; and purifying the concentrated lithium rich stream by removing sodium and potassium ions to produce a concentrated lithium rich stream having reduced sodium and potassium ion concentrations.

BRIEF DESCRIPTION OF THE DRAWINGS

The present disclosure will be better understood in view of the following non-limiting figures, in which:

FIG. 17 shows a system for extracting lithium in a column according to one embodiment.

DETAILED DESCRIPTION OF THE INVENTION

I. Introduction

Figure 1:
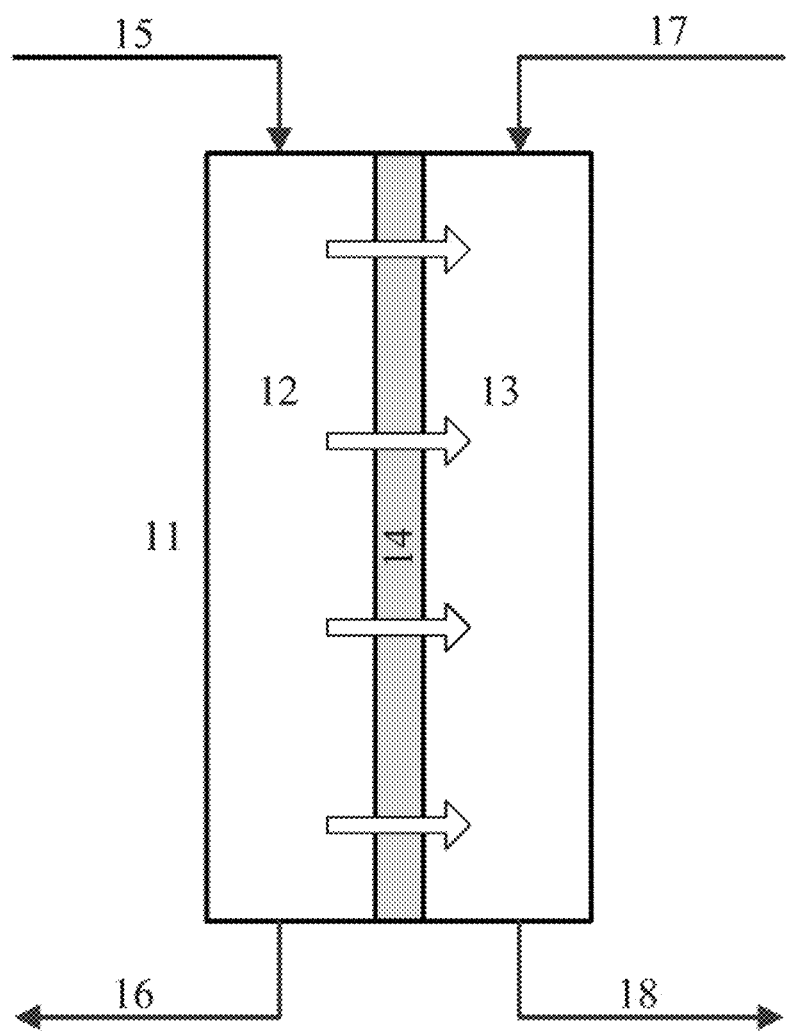
FIG. 1 is a schematic block diagram of an exemplary forward osmosis system according to some embodiments.

The present invention will now be described more fully hereinafter with reference to the accompanying drawings, which illustrate various embodiments of the invention. This invention, however, may be embodied in many different forms and should not be construed as limited to the embodiments set forth herein. Rather, these embodiments are provided so that this disclosure will be thorough and complete, and will fully convey the scope of the invention to those skilled in the art. It is to be fully recognized that the different teachings of the various embodiments discussed below may be employed separately or in any suitable combination to produce desired results. The various characteristics mentioned above, as well as other features and characteristics described in more detail below, will be readily apparent to those skilled in the art upon reading the following detailed description of the various embodiments, and by referring to the accompanying drawings. In the drawings and description that follow, like parts are marked throughout the specification and drawings with the same reference numerals, respectively. The prime notation, if used, indicates similar elements in alternative embodiments. The drawings are not necessarily to scale. Certain features of the disclosure may be shown exaggerated in scale or in somewhat schematic form and some details of conventional elements may not be shown in the interest of clarity and conciseness.

Where the specification or the claims provide a range of values, it is understood that the interval encompasses each intervening value between the upper limit and the lower limit as well as the upper limit and the lower limit. The invention encompasses and bounds smaller ranges of the interval subject to any specific exclusion provided. Where the specification and claims reference a method comprising two or more defined steps, the defined steps can be carried out in any order or simultaneously except where the context excludes that possibility.

As used herein, a unit refers to the set of equipment, structures, processes, materials, and other components that perform a specific operation in a chemical processing plant. A chemical process plant can have one or more units to process the raw materials and obtain the desired products. The various units are usually connected to one another directly or indirectly by a variety of means including but not limited to electrical, mechanical, or fluid means, in a way that allow materials to be transported from one unit to the next when each operation is complete.

As used herein, a brine solution refers to a solution of alkali and/or alkaline earth metal salt(s) in water, wherein the concentration of salts can vary from trace amounts up to the point of saturation. Generally, brines suitable for the methods described herein can be aqueous solutions that may include alkali metal or alkaline earth chlorides, bromides, sulfates, hydroxides, nitrates, and the like, as well as natural brines. Brines can be obtained from natural sources, such as, Chilean brines or Salton Sea geothermal resource brines, geothermal brines, sea water, mineral brines (e.g., lithium chloride or potassium chloride brines), alkali metal salt brines, and industrial brines, for example, industrial brines recovered from ore leaching, mineral dressing, and the like. The present methods are equally applicable to artificially prepared lithium chloride containing brine solutions.

In certain embodiments, a brine solution may be a geothermal brine solution. In certain other embodiments, a brine solution may be a geothermal brine solution that has been subjected to silica removal processes. In some embodiments, the concentrated brine solution serves as the draw solution to a forward osmosis unit. The draw solution is any solution that provides for the higher osmotic pressure in a forward osmosis unit. As a result of forward osmosis, the draw solution is diluted due to the introduction of water. The draw solution is usually a highly concentrated solution on the permeate side of a selectively permeable membrane. In certain embodiments, the draw solution has a concentration of dissolved solids from about 5 to 30 weight %, preferably greater than about 10 weight %, more preferably greater than about 15 weight %, based on the total weight of the draw solution. In certain embodiments, the draw solution has a concentration of dissolved solids at about 20 weight % of the draw solution. In certain embodiments, the draw solution may be a geothermal brine. In certain embodiments, the draw solution may be a geothermal brine after removal of some elements such as iron, arsenic, silicon, and maybe zinc and manganese. In certain embodiments, the geothermal brine may contain a mixture of primarily sodium chloride, calcium chloride and potassium chloride with minor amounts of other salts. In certain embodiments, the geothermal brine may have a sodium chloride concentration from about 15 to about 20 weight %, calcium chloride concentration from about 6 to about 12 weight %, and potassium chloride concentration from about 2 to about 5 weight %, based on the total weight of the geothermal brine. In certain embodiments, the geothermal brine may have total dissolved salts concentration from about 25 to about 30 weight % based on the total weight of the geothermal brine. In certain embodiments, the draw solution may be a solution of essentially saturated sodium chloride. In certain embodiments, the draw solution may be a solution of about 20 to about 40 weight % of lithium chloride based on the total weight of the draw solution.

As used herein, a lithium containing solution refers to any aqueous media containing lithium ions or lithium salts, as the term is known and understood by those skilled in the art. The lithium containing solution serves as the feed solution to a forward osmosis unit. The feed solution is any solution that contains lithium ions or lithium salts and is subject to concentration by a forward osmosis unit. In certain embodiments, a lithium containing solution may be a lithium salt solution. In certain embodiments, a lithium containing solution may be a lithium halide solution. In another embodiment, a lithium containing solution may be a lithium chloride solution. In another embodiment, a lithium containing solution may be a lithium carbonate solution. In another embodiment, a lithium containing solution may be a lithium hydroxide solution. In another embodiment, a lithium containing solution may be a combination of any of the lithium halides, lithium carbonate, and lithium hydroxide solutions.

A lithium containing solution may have a concentration of lithium chloride between about 0.1 and 10 weight %, preferably less than about 8 weight %, more preferably less than about 6 weight %, based on the total weight of the lithium containing solution. In alternate embodiments, the lithium containing solution may have a concentration of lithium chloride less than about 5 weight %. A lithium chloride solution may have a concentration of lithium between about 0.1 and 10 weight %, preferably less than about 8 weight %, more preferably less than about 6 weight %, based on the total weight of the lithium chloride solution. In alternate embodiments, a lithium chloride solution may have a concentration of lithium of less than about 5 weight %. In certain embodiments, the lithium containing solution can be a solution of lithium chloride containing from about 2 to about 6 weight % lithium chloride, with less than 2 weight % sodium chloride and potassium chloride, based on the total weight of the lithium containing solution. In certain embodiments, the concentration of sodium and potassium chloride is preferably less than about 1 weight %, based on the total weight of the lithium containing solution. In certain embodiments, silica may be present in the lithium containing solution or geothermal brine, and may be removed by a variety of known methods (e.g., U.S. Pat. No. 4,016,075), prior to use in the methods described herein. Thus, in certain embodiments, the methods for the preparation of lithium carbonate described herein can include a silica management step. In some embodiments, the brine is supplied to a silica management step, wherein silica is removed from the brine to produce a silica-free brine or lithium containing solution.

As used herein, a forward osmosis unit refers to a unit configured to carry out a separation process in which the osmotic pressure difference serves as a driving force for the transfer of molecules and at least one selectively permeable membrane acts as separator. A difference in solute concentrations across the membrane allows the passage of water, but rejects most solute molecules or ions. In certain embodiments, a forward osmosis system may include one or more forward osmosis units. Membranes contemplated for this system include forward osmosis membranes, ultrafiltration, and microfiltration membranes.

The selectively permeable membranes provide high water permeability, high rejection of solutes, and high chemical and mechanical stability. These membranes are usually resistant to fouling and adverse effects of high temperatures. In certain embodiments, the selectively permeable membranes can be compatible with high chloride brines. The selectively permeable membranes may be arranged in a variety of configurations. In certain embodiments, the selectively permeable membranes may be in a flat-sheet configuration. In certain embodiments, the selectively permeable membranes may be flat-sheet membranes in plate and frame configurations. In certain embodiments, the selectively permeable membranes may be arranged to increase packing density, for example, in a hollow-fiber or a capillary configuration. In certain embodiments, the selectively permeable membranes may be in a tubular configuration. In certain embodiments, the selectively permeable membranes may be multilayered. For example, the selectively permeable membrane may comprise an active layer adjacent to a support layer. In certain embodiments, the selectively permeable membranes may comprise polymer meshes. In certain embodiments, the selectively permeable membranes may comprise cellulose esters. In certain embodiments, the selectively permeable membranes may comprise cellulose acetate. In certain embodiments, the selectively permeable membranes may comprise cellulose triacetate. In certain embodiments, the selectively permeable membranes may comprise aromatic polyamide polymers.

In certain embodiments, the flow regime in the forward osmosis unit is counter current flow, where the flow direction of the feed solution is opposite to the flow direction of the draw solution in the forward osmosis units. In certain embodiments, the flow regime in the forward osmosis unit is co-current flow, where the flow direction of the feed solution is the same as the flow direction of the draw solution in the forward osmosis units. In certain embodiments, the flow regime in the forward osmosis unit may include different flow rates for the feed solution and the draw solutions. In certain embodiments, the flow regime in the forward osmosis unit may include one or more pumping units that regulate the flow rates and directions of flow of the feed and draw solutions.

In certain embodiments, the feed solution is introduced to the forward osmosis unit at about 300 gallons per minute, and comprises about 4-6 weight % lithium chloride, 1 weight % sodium chloride, 0.5 weight % potassium chloride, and small amounts of other impurities. In certain embodiments, the draw solution is about 750 gallons per minute of geothermal brine containing about 17 weight % sodium chloride, 10 weight % calcium chloride, and about 3.5 weight % potassium chloride along with smaller amounts of other salts. About 200 gallons per minute of water pass through the selectively permeable membrane to the concentrated brine solution. In certain embodiments, the concentrated lithium chloride solution flow rate is reduced to about 100 gallons per minute and contains from about 15 to 20 weight % lithium chloride. The concentrated brine solution is diluted to about 13 weight % sodium chloride, 8 weight % calcium chloride, and 3 weight % potassium chloride, and the volume is increased to about 950 gallons per minute. In some embodiments, the brine can be used to effectively pull water from the lithium side of the membrane. In this way, it could be possible to enhance the forward effect by applying a pressure to the lithium side of the membrane to enhance the water flux and/or the concentration effect.

The following methods and method steps are in no particular order and may not be sequential.

Provided in FIG. 1 is an exemplary method and system for the concentration of lithium containing solution using a forward osmosis unit 11. In certain embodiments, this method and system may be placed as the ultimate process in the concentration of lithium containing solutions. In certain embodiments, this method and system may function as a pretreatment step before mineral extraction or recovery processes. In one embodiment, the forward osmosis unit 11 has at least two chambers 12 and 13, separated by a selectively permeable membrane 14. A lithium containing solution enters chamber 12 through at least one inlet 15 and exits through at least one outlet 16. A concentrated brine solution enters through at least one inlet 17 and exits through at least one outlet 18. The selectively permeable membrane 14 allows the passage of water from the lithium containing solution chamber 12 to the brine chamber 13. By placing a more concentrated brine on the permeate side of the membrane, the osmotic pressure is forward, and water is drawn from the lithium containing solution to the concentrated brine solution.

In certain embodiments of this process, the lithium containing solution is a lithium chloride solution. For example, without limitation, it may be commercially desirable to concentrate a lithium chloride solution from about 0.5 weight % lithium chloride to about 20 weight %, based on the total weight of the lithium chloride solution. This is achieved by using a concentrated brine solution in a forward osmosis unit that may include, for example, a geothermal brine, salt brine, or concentrated lithium chloride solutions from subsequent processing steps. In certain embodiments, a concentrated lithium containing solution may have a concentration of lithium from about 2 to 20 weight %, preferably greater than about 8 weight %, more preferably greater than about 10 weight %, based on the total weight of the concentrated lithium chloride solution. In alternate embodiments, the concentrated lithium containing solution may have a concentration of lithium greater than about 15 weight %.

Figure 2:
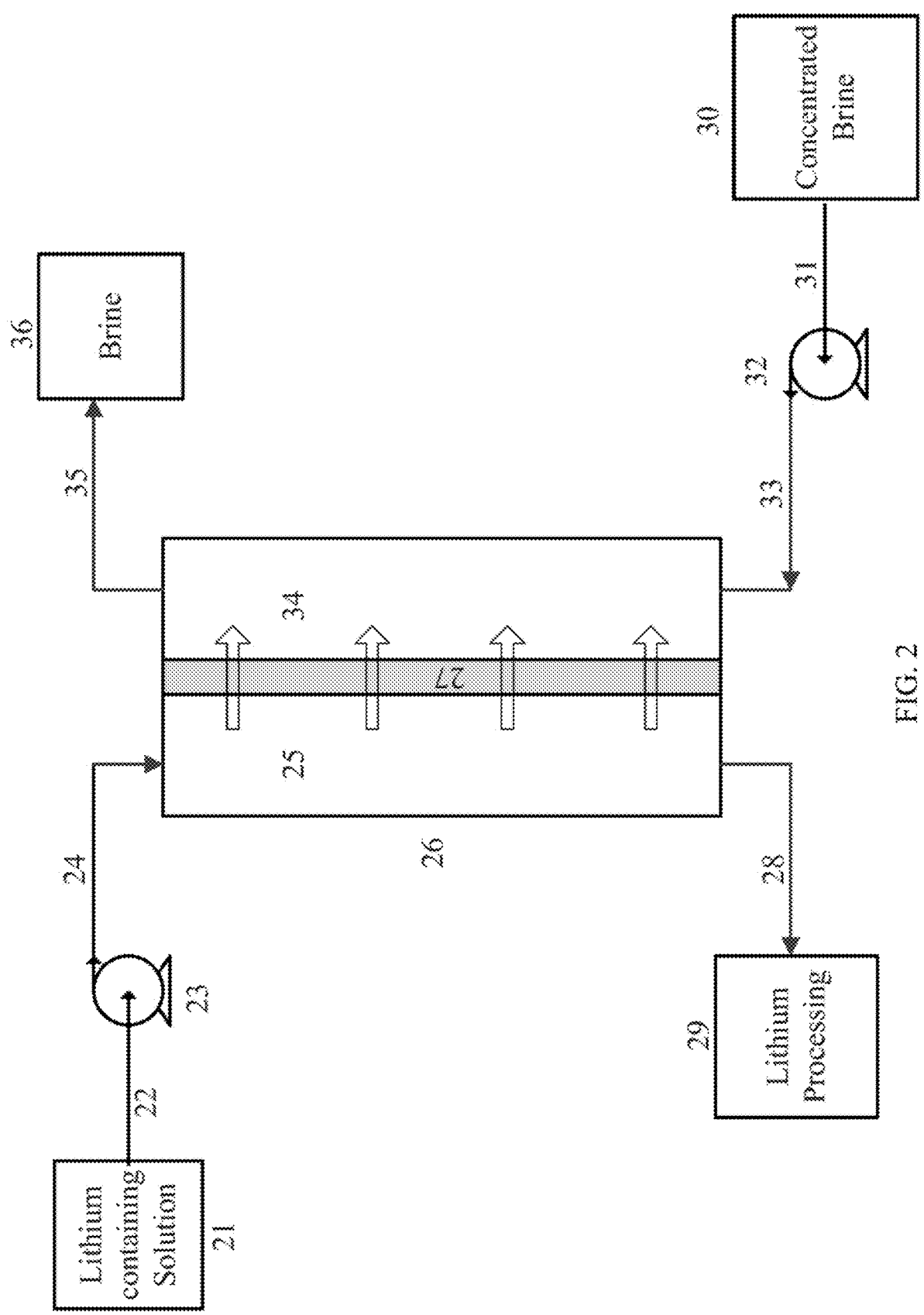
FIG. 2 is a schematic block diagram of another exemplary forward osmosis system according to some embodiments.

FIG. 2 illustrates an exemplary method for the concentration of lithium containing solution from a brine or other lithium containing solution. As an initial step of the method, the brine may be supplied to a silica management step, wherein silica is removed from the brine to produce a silica-free lithium containing solution. Then, the silica-free lithium containing solution is a diluted to produce lithium containing solution 21, and may be concentrated using a forward osmosis unit 26 to produce a concentrated lithium ion containing solution. The lithium containing solution 21 is supplied via a line 22 to a pump 23. As used herein, a pump is an apparatus for transferring fluids from one location to another according to set conditions. Such conditions include, without limitations, a set flow rate, time intervals, flow direction, and combinations thereof. The outlet pressure of the pump can be increased to further enhance the amount of water passing through the membrane. Pump 23 delivers the lithium containing solution through an inlet 24 to a chamber 25 of a forward osmosis unit 26. While in this chamber 25, the lithium containing solution is in contact with a selectively permeable membrane 27 that separates the chamber 25 from a concentrated brine containing chamber 24. Due to the osmotic pressure difference between the fluids in the two chambers 25 and 214, water moves from the lithium containing solution through the selectively permeable membrane 27 to the concentrated brine solution. A concentrated lithium containing solution exits the forward osmosis unit 26 through the outlet 28 to further lithium processing steps 29, including but not limited to, lithium extraction by electrochemical means, by physical adsorption means, by chemical means, or combinations thereof. Other exemplary lithium processing steps may include solvent extraction, intercalated lithium absorbent columns, electrodialysis, forward osmosis, steam evaporation, or solar evaporation. In certain embodiments, a lithium containing solution contains lithium chloride, and the concentrated lithium chloride solution can be subsequently processed to produce lithium carbonate, lithium hydroxide, and other lithium salts.

In some embodiments, the lithium containing solution is supplied to silica management step which operates to significantly reduce the amount of silica that may be present in lithium containing solution, such that silicate precipitate and silica-lean lithium chloride containing solution are produced. Preferably, after the silica management step, the silica concentration in silica-lean lithium chloride containing solution is less than about 150 ppm, more preferably the concentration is less than about 100 ppm, even more preferably the concentration is less than about 50 ppm, and even more preferably the concentration is less than about 25 ppm. In certain embodiments, the concentration of silica in silica-lean lithium chloride containing solution is less than about 20 ppm, less than about 10 ppm, or even less than about 5 ppm. It is understood that the silica management step may be omitted from the process for brines that do not include silica, or brines that have a substantially low initial silica concentration.

In certain embodiments, the silica management step can include the step of contacting lithium chloride containing solution with activated alumina to remove at least a portion of the silica present. Alumina that includes silica bound thereto can be regenerated by contacting the alumina with sodium hydroxide. Alternatively, the lithium containing solution can be contacted with aluminum chloride, which is converted to aluminum hydroxide, and can be used to precipitate silica present in the lithium chloride containing stream. In a further embodiment, iron (II) that may be present in certain lithium containing brines can be oxidized with an oxidant, such as air, hypochlorite, hydrogen peroxide, oxygen, ozone, or a like oxidizing agent, to generate iron (III) chloride, which after adjustment of the pH to above about 5, from an initial pH of about 2.5 to 3.5, will precipitate ferric hydroxide. The ferric hydroxide can adsorb silica from the lithium containing brine. In some embodiments, the pH is adjusted to between about 5 and 6 to induce precipitation of silica and iron. In alternate embodiments, the pH is adjusted to above at least about 4.5 to induce precipitation of silica and iron. In certain embodiments, the pH is not increased above about 6, to prevent the precipitation of other ionic species present in the lithium containing brine. In yet another embodiment, iron (II) can be added to the lithium chloride containing solution and oxidized by known means to iron (III), such as with by contacting the iron (II) with an oxidant, such as air, oxygen, ozone, hypochlorite, hydrogen peroxide, or other suitable oxidizing agent. Contacting silica present in the lithium chloride containing solution with the iron (III) compound forms a precipitate when the pH is adjusted to between about 4.5 and 6 with the addition of lime or similar base. It a preferred embodiment, the pH is adjusted to between about between about 5 and 6. In alternate embodiments, the pH must be adjusted to above at least about 4.5 for the silica and iron to precipitate. In certain embodiments, it is preferred the pH is not increased above about 6, to prevent the precipitation of other ionic species.

In addition, the silica management step can include any known means for removing a portion of the silica present in the feed stream, while at the same time maintaining the initial concentration of lithium. In one embodiment, lithium containing solution can be contacted with aluminum chloride, iron chloride, aluminum hydroxide, or the like, to form a precipitate with the silica. Contacting can be facilitated by known means, such as a mixing device. Solid silica precipitate removed from lithium chloride containing solution can be collected and removed from the mixing or like device, by known means, such as screening or filtering, to yield lithium chloride containing stream that is substantially free of silica.

In certain embodiments, concentrated brine solution 30 can be fresh geothermal brine, depleted brine from extraction processes, or brine made from water, or brine with added salt. Concentrated brine solution 30 is delivered via line 31 to pump 32 that then delivers the concentrated brine solution through an inlet 33 to a chamber 34 of the forward osmosis unit 26.

As discussed above, due to the forward osmosis process, water from the lithium containing solution moves through the selectively permeable membrane 27 to the concentrated brine solution, thereby diluting the concentration of the brine. In certain embodiments, the concentration of dissolved solids in the concentrated brine solution entering the forward osmosis unit is about 20% weight by weight. In certain embodiments, the concentration of dissolved solids in the less concentrated brine solution 35 exiting the forward osmosis unit is less than about 20% weight by weight. The less concentrated brine 36 can be recycled to the forward osmosis system or can be mixed with salt to increase the concentration before being recycled to the forward osmosis system. In certain embodiments, the less concentrated brine 36 can be advanced to other metal extraction processes; or it can be returned to the geothermal brine aquifer.

In some embodiments, a lithium containing solution (e.g., from a geothermal brine) is pretreated to reduce or eliminate silica and then further processed to render the solution suitable for concentration by forward osmosis. In certain embodiments, the method includes the step of supplying the concentrated lithium containing solution to a forward osmosis apparatus to concentrate the $Li_2CO_3$, wherein the forward osmosis apparatus is operable to remove $CO_2$ from the solution and cause $Li_2CO_3$ to precipitate. In certain embodiments, the precipitated $Li_2CO_3$ has a purity of at least about 99.999%. In alternate embodiments, the precipitated $Li_2CO_3$ has a purity of at least about 99.9999%. In certain embodiments, the method includes the step of supplying the concentrated lithium containing solution to a forward osmosis apparatus, wherein the forward osmosis apparatus is configured to operate at high pressures, thereby concentrating the $Li_2CO_3$.

In further embodiments, the lithium concentration is increased by forward osmosis. In such methods, the forward osmosis apparatus is fed a lithium containing solution substantially free of silica. In some embodiments, the lithium containing solution that is fed to the forward osmosis apparatus has at least 1% wt. lithium chloride. In some embodiments, the lithium containing solution that is fed to the forward osmosis apparatus has at least 2% wt. lithium chloride. In further embodiments, the lithium containing solution has no greater than 1000 mg/kg sodium chloride. In further embodiments, the lithium containing solution has no greater than 100 mg/kg calcium equivalents.

In further embodiments for an exemplary forward osmosis system, the lithium containing solution (e.g., from the silica management step) is fed to a forward osmosis system using a pump. From forward osmosis system, water is fed to the permeate. The concentrated lithium containing solution is fed to the concentrate. The permeate can then be fed back to the forward osmosis system using the pump. In some embodiments, where the forward osmosis system involves a cascade system, the lithium containing solution is fed to a first forward osmosis system using a first pump. From first forward osmosis system, first water stream is fed to the permeate and first concentrated lithium containing solution is fed to a second forward osmosis system using a second pump. From the second forward osmosis system, the second water stream is fed to permeate and the second concentrated lithium containing solution is fed to third osmosis system using a third pump. From the third forward osmosis system, the third water stream is fed to permeate and the third concentrated lithium containing solution is fed to the concentrate.

In some embodiments, the present disclosure relates to processes for producing lithium hydroxide and lithium carbonate from a lithium salt-containing brine. In some embodiments, the processes include a step that concentrates lithium via a sorbent that allows for selective lithium retention and recovery, and further steps that concentrate the recovered lithium product via forward osmosis. In some embodiments, the present methods include the preparation and recovery of lithium carbonate from solutions that include, in addition to lithium, other various monovalent, divalent, and multivalent cations (e.g., potassium, sodium, calcium, barium, magnesium, manganese, etc.), as well as various monovalent, divalent, and multivalent anions (e.g., sulfate, chloride, phosphate, etc.).

Figure 4:
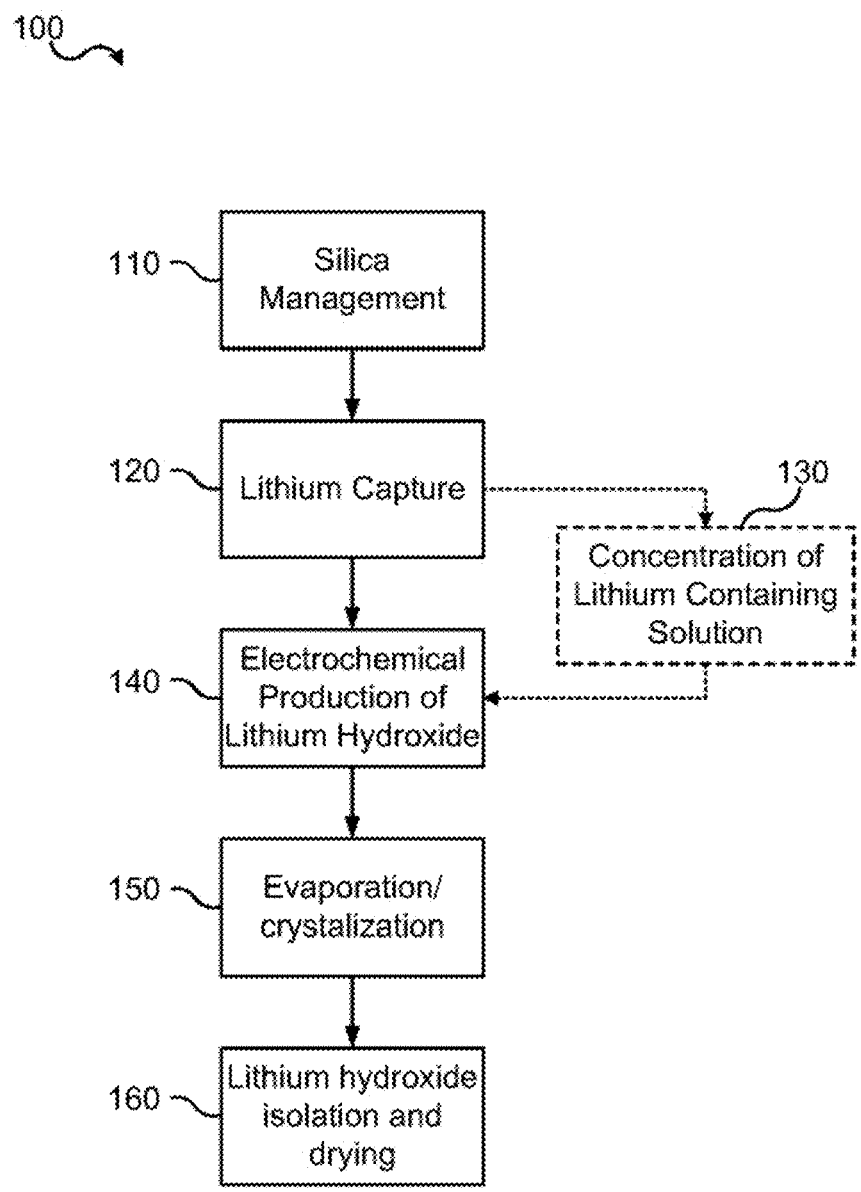
FIG. 4 is a flow chart of a method for producing lithium hydroxide from a geothermal brine according to one embodiment.

FIG. 4 shows a flow chart of a method for producing lithium hydroxide from a geothermal brine according to one embodiment. The method 100 generally includes processing a lithium salt containing brine, such as for example, a geothermal brine, in the following steps: a silica management step 110, a lithium capture step 120 (lithium salt extraction step), an optional concentration of lithium containing solution step 130, an electrochemical production of lithium hydroxide step 140, an evaporation/crystallization step 150, and a lithium hydroxide isolation and drying step 160. The term "lithium" as used herein refers to ionic forms of lithium and as such will include, for example, lithium salts such as lithium halides, lithium sulfates, and lithium nitrates, or some combination thereof. In some embodiments, the lithium salt is lithium chloride.

Figure 5:
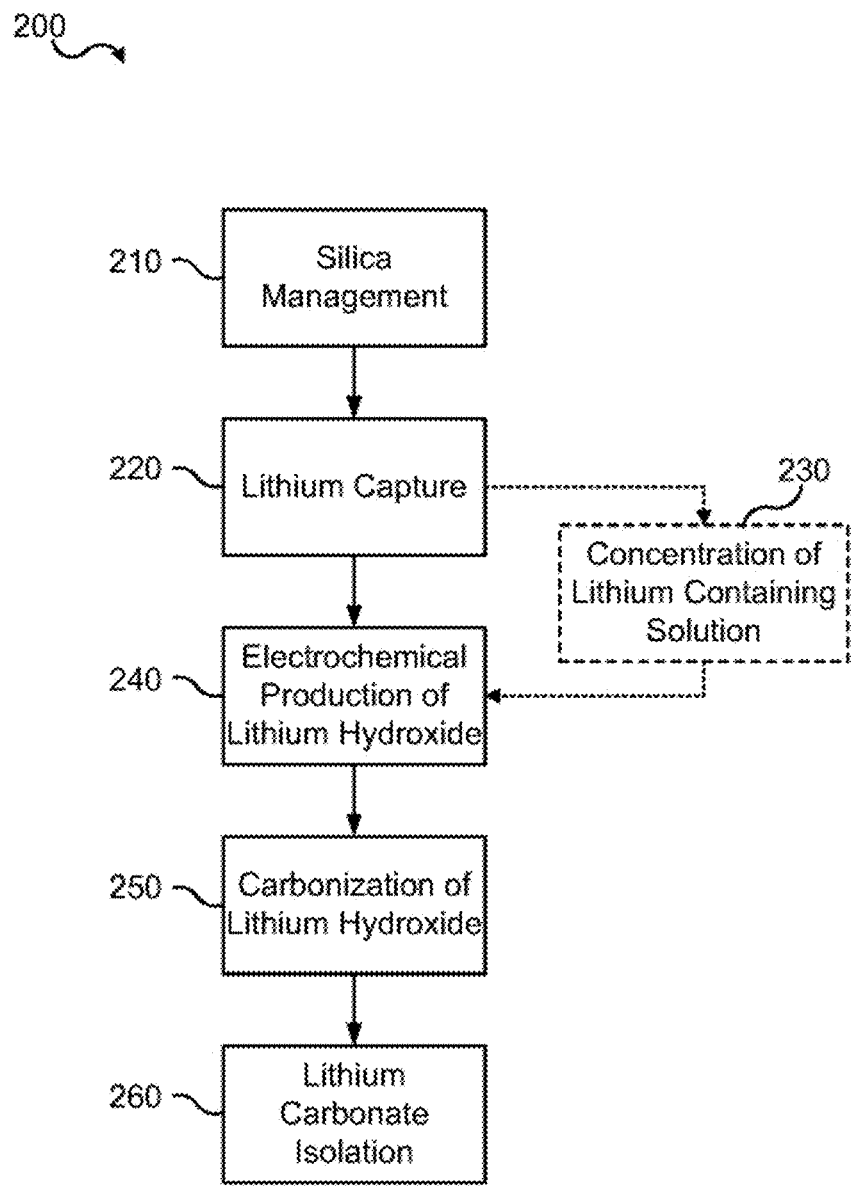
FIG. 5 is a flow chart of a method for producing lithium carbonate from a geothermal brine according to one embodiment.

FIG. 5 shows a flow chart of a method for producing lithium carbonate from a geothermal brine according to one embodiment. The method 200 for producing lithium carbonate generally includes a step of processing a lithium salt containing brine, such as for example, a geothermal brine, in the following steps: silica management step 210, lithium capture step 220 (lithium salt extraction step), electrochemical production of lithium hydroxide step 240, carbonation of lithium hydroxide step 250, and lithium carbonate isolation step 260. In this method 200, lithium hydroxide is converted to lithium carbonate.

In some embodiments, after lithium capture step 220, the method can optionally include concentration of lithium containing solution step 230. In some versions of method 200, after optional step 230, the lithium containing solution may be reacted with sodium carbonate to produce lithium carbonate.

Figure 6:
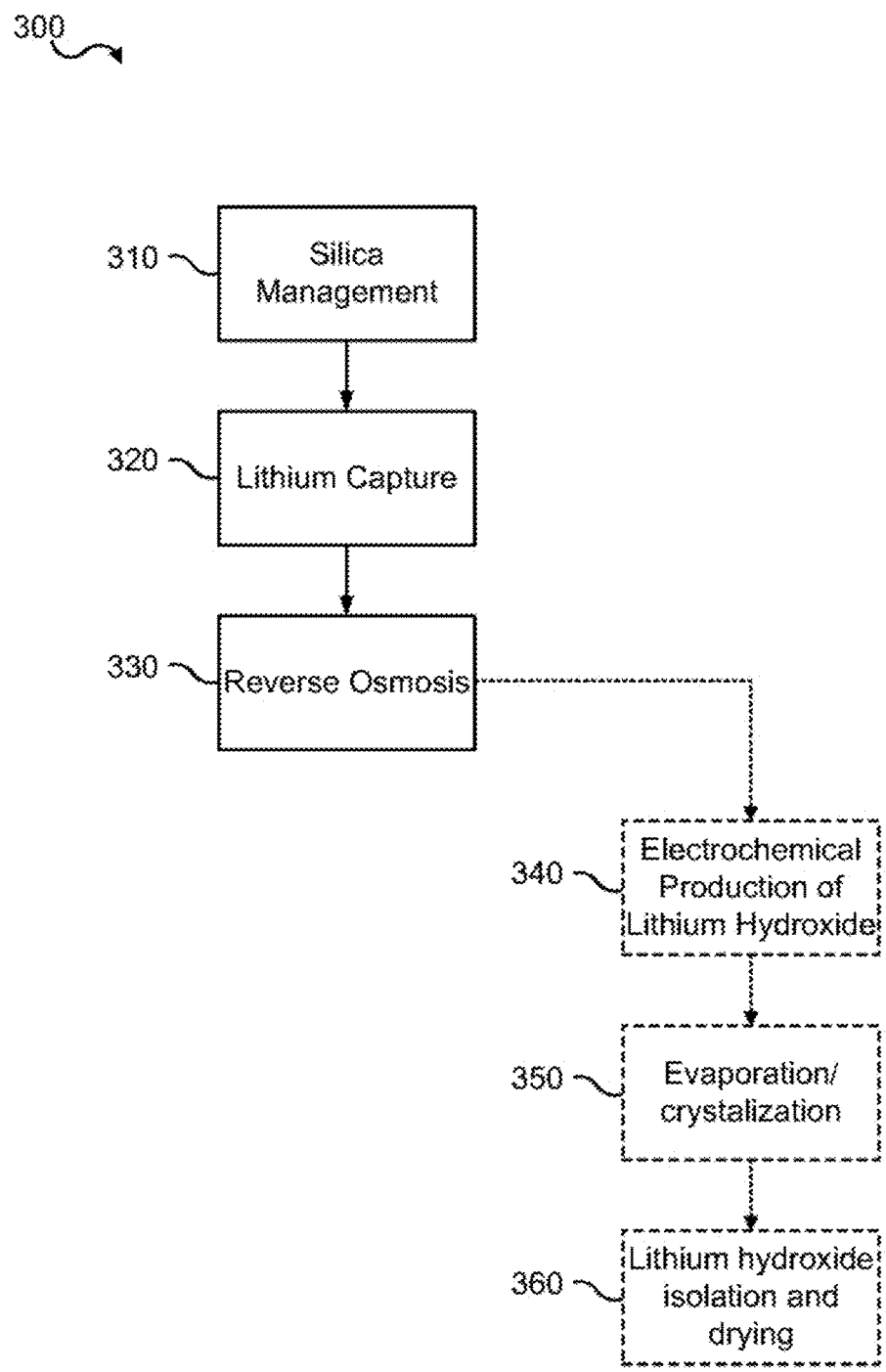
FIG. 6 is a flow chart of a method for concentrating a stream from a lithium capture step in a process of producing lithium hydroxide according to one embodiment.

Referring to FIG. 6, provided is a method 300 for the isolation and concentration of lithium ions from a brine or other lithium containing solution, and the optional subsequent production of lithium carbonate therefrom, according to another embodiment. The brine is supplied to silica management step 310, wherein silica is removed from the brine to produce a silica-free brine or lithium containing solution. After silica management step 310, lithium ions are removed from the silica-free brine or lithium containing solution in lithium capture step 320 to form a lithium ion containing solution. The lithium ion containing solution produced from lithium capture step 320 is concentrated via forward osmosis step 330 to produce a concentrated lithium ion containing solution. After forward osmosis step 330, there can be optional further concentration of the lithium containing solution, followed by an optional purification step to remove sodium and potassium before the solution is fed to electrochemical production of lithium hydroxide step 340.

Methods to remove sodium and potassium from lithium chloride solutions are well known and include those described in: U.S. Pat. No. 4,920,588; Nakajima, Yasushi et al, "Sodium Selective Ion-Exchange Properties of Zirconium Phosphate, $HZr_2(PO_4)_3$, and Its Application for the Removal of Sodium Ions," Analytical Sciences Vol. 12, December 1996, pp. 935-940; and Sun, Jian-Zhi, "Synthesis and Absorption Properties of Novel Na Specific Sorbent," Journal of Chilean Chemical Society v.53(4), 2008 pp. 1682-1683. Additionally, gains in purity of lithium hydroxide monohydrate can be made by employing a sorbent to remove potassium and sodium impurities.

Optionally, the concentrated lithium ion containing solution from the forward osmosis step 330 can then be fed through additional process steps to produce lithium hydroxide. In this optional process, the concentrated lithium ion containing solution from forward osmosis step 330 is fed to electrochemical production of lithium hydroxide step 340 to produce a lithium hydroxide containing solution. The lithium hydroxide containing solution can optionally be processed in an evaporation/crystallization step 350 to remove water from the lithium hydroxide containing solution to crystallize at least a portion of the lithium hydroxide. In an optional lithium hydroxide isolation and drying step 360, the lithium hydroxide is isolated, recovered, and dried.

Optionally, the lithium ion containing solution from the lithium capture step 320 can also be fed to purification of the lithium ion containing solution step before forward osmosis step 330, or purification of the lithium ion containing solution could occur after forward osmosis step 330. This optional purification of the lithium ion containing solution can include removal of divalent ion impurities. Purification of lithium ion containing solution is optional because it will be dependent on the lithium ion concentration from lithium capture step 320. If the lithium ion containing solution from lithium capture step 320 is sufficiently pure for feeding to forward osmosis step 330, then the optional purification will not be necessary.

Figure 7:
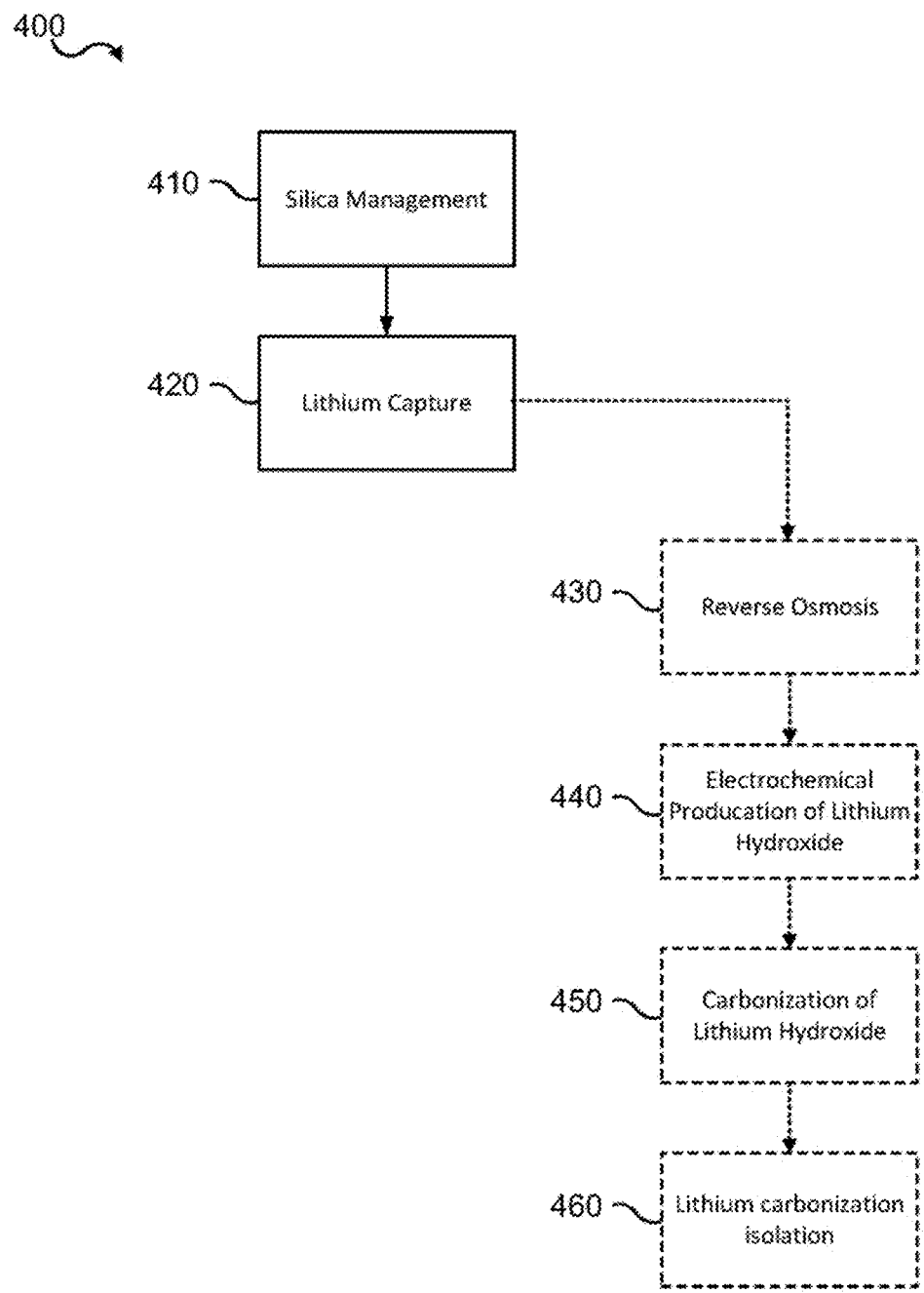
FIG. 7 is a flow chart of a method of using forward osmosis to concentrate a stream from a lithium capture step in a process of producing lithium carbonate according to one embodiment.

Referring to FIG. 7, provided is a method 400 for the isolation of lithium ions from a brine or other lithium containing solution and the subsequent production of lithium carbonate therefrom, according to another embodiment. A brine is supplied to silica management step 410, wherein silica is removed from the brine to produce a silica-free brine or lithium containing solution. The silica-free brine or lithium containing solution is then processed in lithium capture step 420. In lithium capture step 420, lithium ions are removed from the silica-free brine or lithium containing solution to obtain a lithium ion containing solution.

The lithium ion containing solution obtained from the lithium capture step 420 may undergo further optional processing to obtain lithium carbonate. In an optional forward osmosis step 430, the lithium ion containing solution can be concentrated to produce a concentrated lithium ion containing solution via forward osmosis. In an optional electrochemical production of lithium hydroxide step 440, the concentrated lithium ion containing solution is supplied to an electrochemical cell to produce lithium hydroxide. Then, the lithium hydroxide can be supplied to carbonation of lithium hydroxide step 450, where lithium hydroxide is converted to lithium carbonate. Finally, in lithium carbonate isolation step 460, lithium carbonate is isolated and recovered.

Figure 8:
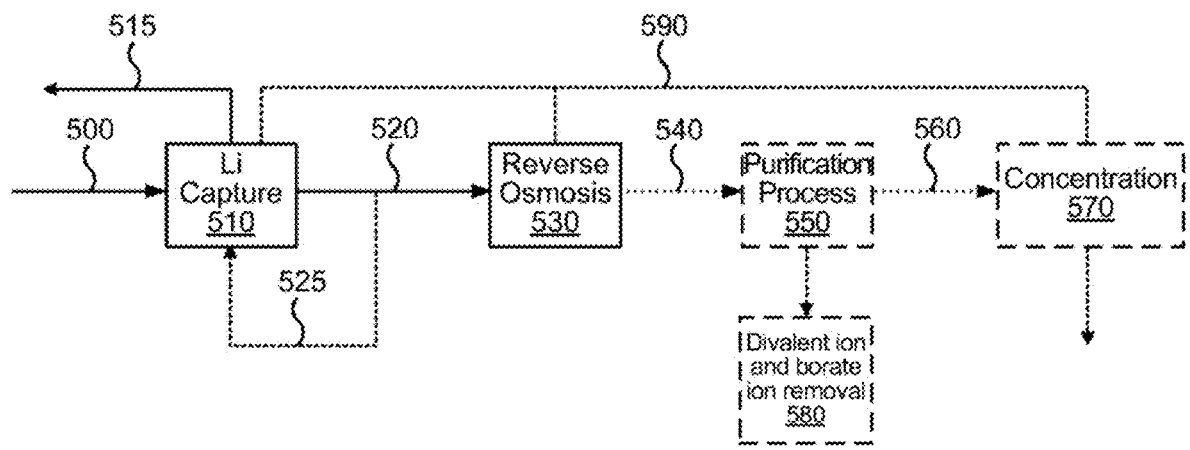
FIG. 8 is a schematic diagram of a system for producing lithium carbonate from a geothermal brine according to one embodiment.

Referring to FIG. 8, provided is a multistep process for the isolation and concentration of lithium ions from a brine or other lithium containing solution according to one embodiment. A brine is supplied to a silica management step (not shown), wherein silica is removed from the brine to produce a silica-free brine or lithium containing solution 500. The silica-free brine or lithium containing solution 500 is then supplied to lithium capture step 510. In lithium capture step 510, lithium ions are removed from the silica-free brine or lithium containing solution 500 to form a lithium ion containing solution 520. The lithium ion containing solution 520 from lithium capture step 510 is then concentrated in forward osmosis step 530 to produce a concentrated lithium ion containing solution 540. The forward osmosis permeate (line 505), which essentially comprises water, is recycled back to lithium extraction as the condensate stream (line 590) produced by the concentration of lithium chloride due to the evaporation of water. Line 600 represents the concentrated lithium chloride stream.

The concentrated lithium ion containing solution 540 can optionally undergo further processing. In an optional electrochemical production of lithium hydroxide step, the concentrated lithium ion containing solution 540 is supplied to an electrochemical cell to produce lithium hydroxide. The lithium hydroxide can be supplied to an optional carbonation of lithium hydroxide step where lithium hydroxide is converted to lithium carbonate. In an optional lithium carbonation isolation step, lithium carbonate is isolated and recovered. The lithium ion containing solution from the lithium capture step can also be fed to an optional purification of lithium ion containing solution step before a forward osmosis step 530 (not shown), or the purification of lithium ion containing solution step 550 could occur after the forward osmosis step 530.

This optional purification of lithium ion containing solution step 550 can include removal of divalent ion impurities 580. Purification of lithium ion containing solution is optional because it will be dependent on the lithium ion concentration from the lithium capture step 510. If the lithium ion containing solution 520 from lithium capture step 510 is sufficiently pure for feeding to the forward osmosis step 530, then the optional purification step 550 will not be necessary. After the optional purification step 550, the purified lithium ion containing solution 560 can undergo optional further concentration of lithium containing solution 570, followed by an optional purification step to remove sodium and potassium before the solution is fed to electrochemical production of lithium hydroxide.

Figure 9:
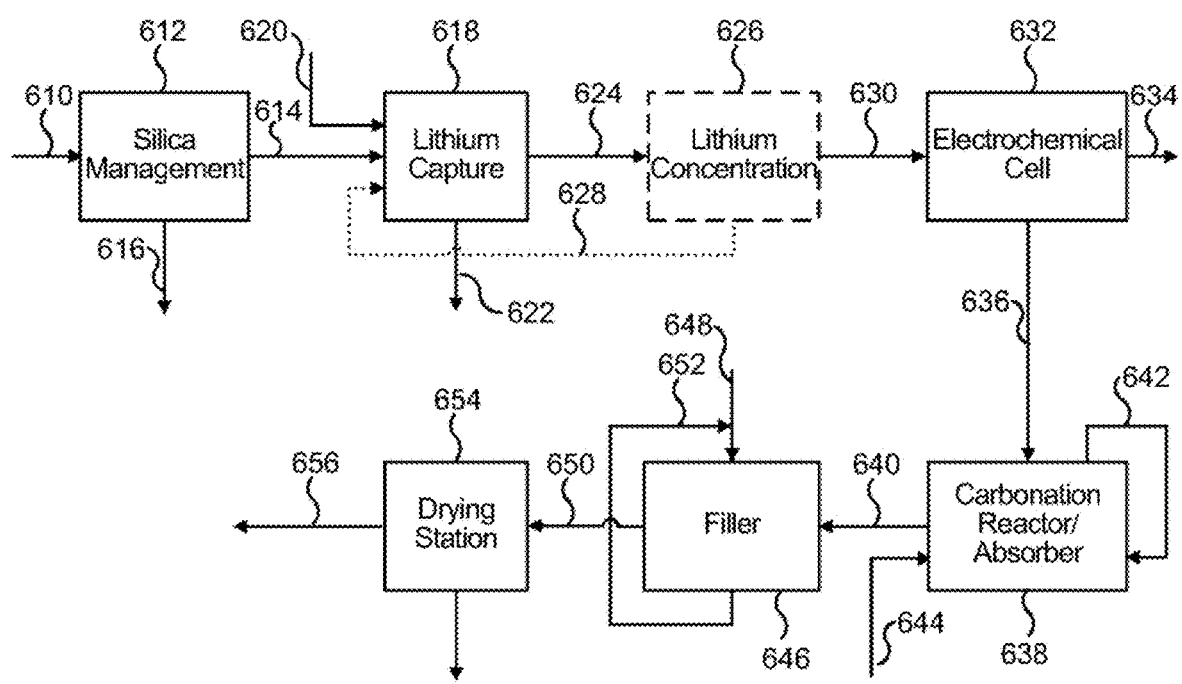
FIG. 9 is a schematic diagram of a first embodiment of system for producing lithium carbonate from a geothermal brine according to one embodiment.

Referring to FIG. 9, in one embodiment of the present method, lithium salt containing solution 610 is provided. As noted above, lithium salt containing solution 610 can be obtained from a variety of sources, including geothermal brines. The lithium salt containing solution is supplied to silica management process 612, which operates to significantly reduce the amount of silica that may be present in lithium salt containing solution 610, such that silicate precipitate 616 and silica-lean lithium salt containing solution 614 are produced. Preferably, after silica management process 612, the silica concentration in silica-lean lithium salt containing solution 614 is less than about 150 ppm, more preferably the concentration is less than about 100 ppm, even more preferably the concentration is less than about 50 ppm, and even more preferably the concentration is less than about 25 ppm. In certain embodiments, the concentration of silica in silica-lean lithium salt containing solution 614 is less than about 20 ppm, less than about 10 ppm, or even less than about 5 ppm. It is understood that silica management process 612 may be omitted or replaced from the process for brines that do not include silica, or brines that have a substantially low initial silica concentration.

In certain embodiments, silica management process 612 can include the step of contacting lithium salt containing solution 610 with activated alumina to remove at least a portion of the silica present. Alumina that includes silica bound thereto can be regenerated by contacting the alumina with sodium hydroxide. Alternatively, the lithium salt containing solution can be contacted with aluminum chloride, which is converted to aluminum hydroxide when brought into contact with the brine, and can be used to precipitate silica present in the lithium salt containing stream. In a further embodiment, iron (II) that may be present in certain lithium containing brines can be oxidized with an oxidant, such as air, hypochlorite, hydrogen peroxide, oxygen, ozone, or a like oxidizing agent, to generate iron (III) chloride, which after adjustment of the pH to above about 5, from an initial pH of about 2.5 to 3.5, will precipitate ferric hydroxide. The ferric hydroxide can adsorb silica from the lithium containing brine. In a preferred embodiment, the pH is adjusted to from about 5 to 6 to induce precipitation of silica and iron. In alternate embodiments, the pH is adjusted to above at least about 4.5 to induce precipitation of silica and iron. In certain embodiments, it is preferred the pH is not increased above about 6, to prevent the precipitation of other ionic species present in the lithium containing brine. In yet another embodiment, iron (II) can be added to the lithium chloride containing solution and oxidized by known means to iron (III), for example, by contacting the iron (II) with an oxidant, such as air, oxygen, ozone, hypochlorite, hydrogen peroxide, or other suitable oxidizing agent. Contacting silica present in the lithium chloride containing solution with the iron (III) compound forms a precipitate when the pH is adjusted to between about 4.5 and 6 with the addition of lime or similar base. In a preferred embodiment, the pH is adjusted to from about 5 to about 6. In alternate embodiments, the pH must be adjusted to above at least about 4.5 for the silica and iron to precipitate. In certain embodiments, it is preferred the pH is not increased above about 6, to prevent the precipitation of other ionic species.

In addition, silica management process 612 can include any known means for removing a portion of the silica present in the feed stream, while at the same time maintaining the initial concentration of lithium. In one embodiment, lithium chloride containing solution 610 can be contacted with aluminum chloride, iron chloride, aluminum hydroxide, or the like, to form a precipitate with the silicon dioxide. Contacting can be facilitated by known means, such as a mixing device. Solid silica precipitate 616 removed from lithium chloride containing solution 610 can be collected and removed from the mixing device (or other device), by known means, such as screening or filtering, to yield lithium chloride containing stream 614 that is substantially free of silica.

Various membranes can be used to selectively remove specific undesired ions from lithium containing solution 614.

Silica-lean lithium chloride containing stream 614, which is substantially free of silica (measured as $SiO_2$), can be supplied to lithium capture (or lithium extraction) step 618. In certain embodiments, silica-lean lithium chloride containing stream 614 can be supplied to lithium capture process 618 that includes at least one intercalated lithium sorbent column, which can be configured to absorb and isolate lithium chloride from the silica-lean lithium chloride containing solution, while at the same time allowing other ions, such as calcium, magnesium, and/or sodium, or the like, to pass with waste water stream 622, through the use of a selective molecular sieve, membrane, or other like materials. In embodiments that include more than one intercalated lithium sorbent column, the bulk of the lithium can be removed in the first intercalated lithium sorbent column, with any subsequent "polishing" intercalated lithium sorbent columns being used to minimize overall lithium loss during the recovery process.

In certain embodiments, the intercalated lithium sorbent column can be operated as follows. In some embodiments, the lithium alumina intercalate particles have an average diameter of less than 800 µm. In some embodiments, the lithium alumina intercalate particles have an average diameter of less than 700 µm. In some embodiments, the lithium alumina intercalate particles have an average diameter of less than 600 µm. In some embodiments, the lithium alumina intercalate particles have an average diameter of less than 500 µm. Lithium alumina intercalate particles having an average diameter of less than 400 µm. In some embodiments, the lithium alumina intercalate particles have an average diameter of less than 300 µm. In some embodiments, the lithium alumina intercalate particles have an average diameter of less than 200 µm. In some embodiments, the lithium alumina intercalate particles have an average diameter of less than 100 µm. In some embodiments, the lithium alumina intercalate particles have an average diameter of between about 100 and 150 µm. In some embodiments, the lithium alumina intercalate particles have an average diameter of between about 150 and 200 µm. In some embodiments, the lithium alumina intercalate particles have an average diameter of between about 200 and 250 µm. In some embodiments, the lithium alumina intercalate particles have an average diameter of between about 250 and 300 µm. In some embodiments, the lithium alumina intercalate particles have an average diameter of between about 300 and 350 µm. In some embodiments, the lithium alumina intercalate particles have an average diameter of between about 350 and 400 µm. In some embodiments, the lithium alumina intercalate particles have an average diameter of between about 400 and 450 µm. In some embodiments, the lithium alumina intercalate particles have an average diameter of between about 450 and 500 µm. In some embodiments, the lithium alumina intercalate particles have an average diameter of between about 500 and 550 µm. In some embodiments, the lithium alumina intercalate particles have an average diameter of between about 550 and 600 µm. In some embodiments, the lithium alumina intercalate particles have an average diameter of between about 600 and 650 µm. In some embodiments, the lithium alumina intercalate particles have an average diameter of between about 650 and 700 µm. In some embodiments, the lithium alumina intercalate particles have an average diameter of between about 700 and 750 µm. In some embodiments, the lithium alumina intercalate particles have an average diameter of between about 750 and 800 µm. In certain embodiments, the lithium alumina intercalate particles have an average diameter of between about 200 and 800 µm. Alternatively, lithium alumina intercalate particles have an average diameter of between about 300 and 500 µm, alternatively between about 400 and 700 µm, alternatively between about 350 and 650 µm.

In some embodiments, the lithium alumina intercalate particles can be added to a column, having a particle size of less than about 400 microns. The column may be jacketed, insulated or may include means to provide heating or cooling to the column. The column may include a method of distributing liquid and support for the extraction media and can include fritted ends having a pore size of between approximately 25 and 50 µm, although other like means, such as supports of glass wool or perforated plates, and fractal fluid distributors, can also be used instead of fritted ends. In some embodiments, the operating temperature of the column can be maintained at a temperature that is greater than room temperature (20° C.), and is preferably maintained at a temperature above about 70° C., more preferably from about 95° C. to about 110° C.

The column is maintained wet and is unloaded before first use by circulating at least about 1 bed volume, preferably about 2 bed volumes, of deionized strip water 20 that includes approximately 1000 ppm lithium chloride (or other lithium salt), at a flow rate of between approximately 1 and 4 bed volumes/hour, preferably between about 1.5 and 2.5 bed volumes/hour. The column is then contacted with approximately one bed volume of saturated sodium chloride solution containing approximately 200 ppm lithium chloride and is then operated.

In some embodiments, during loading of the column (i.e., during the step of capturing desired lithium salt), high ionic strength solution 614 containing lithium chloride (or other lithium salt) is supplied to lithium capture process 618 and the lithium concentration of the effluent at waste water stream 622 is measured to determine the point at which the column becomes saturated with the lithium chloride. During the lithium ion capture step, the lithium concentration at waste water stream 622 remains fairly constant and relatively low, for example, approximately from 0 to 100 ppm. At this point, the lithium capture process 618 reaches or nears the point of saturation with lithium ions, however, the concentration of the lithium in the effluent increases, thus indicating that the column has either little or no capacity for additional lithium ions. Upon reaching this point of saturation, flow of the solution that includes lithium chloride to lithium capture process 618 is stopped, and the column is flushed with between about 1 and 5 bed volumes of deionized water, preferably between about 1 and 2.5 bed volumes, and most preferably between about 1 and 1.5 bed volumes, to produce a lithium chloride-rich stream 624. It is understood that the apparatus can include various valves and control devices for controlling the flow of the lithium containing solution or the strip solution to the column.

In certain embodiments, after loading the column, but before collection of the captured lithium chloride (or other lithium salt), the column may be flushed with about 1 bed volume of a 26% saturated sodium chloride solution that includes about 200 ppm lithium chloride.

After the removal of lithium chloride (or other lithium salt) from the lithium containing feed stream during lithium capture process 618, which in some embodiments isolates lithium chloride, intercalated lithium sorbent columns can be regenerated and the lithium chloride recovered therefrom. Specifically, at least about 0.5 equivalents of strip water 620 may be supplied to column(s) used in lithium capture process 618 to remove absorbed lithium chloride and produce lithium chloride rich solution 624. In certain embodiments, between about 1 to 2 equivalents of strip water 620, or more equivalents, may be used during the regeneration of the columns. In preferred embodiments, the strip water may include lithium ions for the regeneration of the columns.

Optionally, low ionic strength liquids, such as alcohols and water/alcohol mixtures can be used to regenerate the columns. In general, the amount of water utilized from the lithium chloride recovery from the column is minimized by recycling the product streams to maximize lithium content, without affecting the capacity of the extracting media. In this context, it is noted that strip solution exiting the column (typically enriched with lithium) is also referred to herein as eluate.

Lithium chloride-rich stream 624 may have a lithium concentration of between about 1% and 6% by weight, preferably greater than about 1% by weight, more preferably greater than about 3% by weight, based on the total weight of the lithium chloride-rich stream 624. In alternate embodiments, lithium chloride-rich stream 624 may have a lithium concentration of greater than about 0.5% by weight. Lithium chloride-rich stream 624 can undergo lithium concentration 626 by various means including evaporation, forward osmosis, solvent extraction or a combination of these processes to produce a concentrated lithium chloride stream 630 having lithium in the range of 10 wt. % to 42 wt. %, based on the total weight of the concentrated lithium chloride stream 630. In preferred embodiments, concentrated lithium chloride stream 630 has a lithium concentration of at least 20 wt. %, more preferably 30 wt. %, and still more preferable 42 wt. %, based on the total weight concentrated lithium chloride stream 630. In the most cases, the concentration of sodium and potassium in the concentrated lithium chloride stream 630 are less than 1 wt. % of stream 630.

In certain embodiments, lithium chloride-rich stream 624 and/or concentrated lithium chloride stream 630 can optionally undergo a purification or concentration step prior to being provided to electrolytic process 632. Optionally, a purification step can be employed to remove calcium, magnesium, or other divalent ions such as zinc and manganese that may be present in lithium chloride (or other lithium salt)-rich stream 624 and/or concentrated lithium chloride stream 630. Removal of calcium, magnesium, and/or other alkaline earth metals can be achieved by known means, such as, by increasing the pH and treating the solution with ion exchange, preferably using selective chelating ion exchange resins, or by the addition of a base, such as lime, sodium hydroxide, lithium hydroxide, or the like, and or by the addition of lithium carbonate, sodium carbonate, potassium carbonate, ammonium carbonate, or other suitable carbonate, which can precipitate magnesium and iron hydroxide, as well as calcium carbonate. In alternate embodiments, ion exchange means can be employed to facilitate the removal of calcium, magnesium, and/or other alkaline earth metals. Other bases, such as sodium hydroxide and other hydroxides of alkali metals, can also be used. In certain brines, it may be beneficial to remove boron from the product stream at this point process by known means, such as by precipitation, solvent extraction, or ion exchange. Methods for the isolation and purification of lithium chloride (or other lithium salt) from brines, including geothermal brines, are known in the art, for example, as described in U.S. Pat. Nos. 4,036,713 and 5,951,843, each of which is herein incorporated by reference in its entirety. In some embodiments, such as those focused on removal magnesium ions, the removal of divalent ions step should occur with lithium chloride-rich stream 624.

This optional purification lithium chloride-rich stream 624 and/or concentrated lithium chloride stream 630 can include removal of sodium and potassium before the concentrated lithium chloride stream 630 is fed to electrochemical cell 632.

In certain embodiments, the process can optionally include one or more filter or separation-purification step(s) prior to the step of supplying concentrated lithium chloride solution 630 or brine to electrochemical cell 632.

Optionally, the process can include steps for increasing the concentration of the lithium chloride stream. Specifically, lithium concentration step 626 can be utilized for the removal of a portion of the water in the lithium chloride stream, for example, by evaporation, thereby producing a more concentrated lithium chloride (or other lithium salt) solution 630. Exemplary concentration methods can include solvent extraction, electrodialysis, steam evaporation, or solar evaporation. In further embodiments, the lithium concentration is by forward osmosis. In such methods, the forward osmosis apparatus is fed lithium chloride-rich stream 624. In some embodiments, the lithium chloride-rich stream that is fed to the forward osmosis apparatus has at least 1% wt. lithium chloride. In some embodiments, the lithium chloride-rich stream that is fed to the forward osmosis apparatus has at least 2% wt. lithium chloride. In further embodiments, the lithium chloride-rich stream has no greater than 1000 mg/kg sodium chloride. In further embodiments, the lithium chloride-rich stream has no greater than 100 mg/kg calcium equivalents. Calcium equivalents includes divalent cations, such as calcium, manganese, magnesium, strontium, and barium. Sodium equivalents include sodium and potassium. In order to calculate equivalents, the molecular weight of the component was assessed. For instance, in order to calculate the calcium equivalent of manganese, the concentration of manganese was divided by the molecular weight of manganese and then multiplied by the molecular weight of calcium.

In further embodiments, the lithium chloride-rich stream has no greater than 30 mg/kg boron. In further embodiments, the forward osmosis apparatus is also fed recycle streams from either the strip water stream from a lithium sorbent column, or from the depleted brine.

In further embodiments, the lithium capture process includes the step of supplying the silica-lean lithium chloride to a lithium sorbent material for the capture of lithium until the lithium sorbent material is saturated with lithium to produce a saturated lithium sorbent material. In some embodiments the lithium sorbent material is an intercalated lithium sorbent. In further embodiments, the recovering lithium salt step comprises stripping the saturated lithium sorbent material with water to produce the lithium rich stream. In some embodiments, the saturated lithium sorbent material is stripped with between about 1 to 4 bed volumes of water. In some embodiments, the saturated lithium sorbent material is stripped with between about 1 to 3 bed volumes of water. In some embodiments, the saturated lithium sorbent material is stripped with between about 1 to 2 bed volumes of water. In some embodiments, the water is a purified water. In some embodiments, the water is deionized water. In some embodiments, the water is recycled from downstream process such as the lithium chloride concentration step.

In some embodiments, water 628 removed from the lithium chloride solution can be recovered, for example by evaporation and subsequent condensation, and resupplied to intercalated lithium sorbent column(s) of lithium capture step 618, or can be supplied to any other step in this or an associated process that requires the supply of water. Alternatively, water 628 can be supplied to a geothermal well. In embodiments employing a concentration step, overall concentration of concentrated lithium chloride-rich solution 630 can be increased to greater than 25% lithium chloride by weight, preferably up to about 40% lithium chloride by weight.

Concentrated lithium chloride-rich solution 630 can be supplied to electrochemical cell 632, which includes at least one anode, one cathode and a permeable membrane, for the electrochemical preparation of lithium hydroxide. Electrochemical cells suitable for large scale production are commercially available from companies, such as, Ineos, DeNora, Chlorine Engineers, and Asahi Glass, to name a few. Specifically, chloride ions are oxidized to chlorine at the anode and water is reduced to hydroxide ions and hydrogen gas at the cathode. Preferably, concentrated lithium chloride-rich solution 630 is substantially free of other ions, particularly ions that may interfere with the electrochemical reaction. Optionally, a lithium chloride-rich stream can supplied directly to the electrochemical reaction, without being first being subjected to the silica management and lithium ion sequestration steps, provided that the lithium chloride-rich stream is substantially free of non-lithium ions, particularly non-lithium ions that may interfere with the electrochemical reaction, for example silica, calcium, and magnesium. In certain embodiments, the concentration of sodium and/or potassium ions in concentrated lithium chloride-rich solution 630 is less than about 5% by weight, preferably less than about 3% by weight, more preferably still less than 1%. Cations such as calcium, magnesium, and the like, if at all present, preferably have a total concentration of less than about 20 ppb by weight, more preferably less than about 10 ppb by weight, and even more preferably less than about 5 ppb by weight. Higher concentrations of the interfering ions does not necessarily preclude operation of the electrochemical cell, but instead may reduce the overall life of the cell components, particularly the membrane and/or the overall effectiveness of the production of lithium hydroxide solution.

Similar to that which is noted above with respect to the presence of non-lithium interfering cations, electrochemical cell 632 preferably has a total non-chloride anion content of less than about 5% by weight, preferably less than about 3% by weight, and even more preferably less than about 1% by weight.

The cathode of electrochemical cell 632 can be any suitable material, including nickel, catalyzed nickel, stainless steel, coated stainless steel, mild steel, and the like. Other exemplary catalysts can include mixed ruthenium and nickel compounds, platinum and other similar compounds that have low hydrogen over potential. The total area of the cathode can be adjusted based upon reactor size and desired production. The catholyte feed to the electrochemical cell 632 can be any suitable material having sufficient ions to carry a current. While water may be employed, and in certain embodiments, the addition of lithium carbonate or lithium hydroxide to water may be beneficial to the operation of the cell.

The anode of electrochemical cell 632 can be any suitable material, such as titanium mesh coated with ruthenium oxide, titanium mesh coated with platinum, carbon, or the like. Preferably, the anode is a dimensionally stable anode, allowing for reduced power consumption. Dimensionally stable ruthenium-iridium oxide on titanium or similar corrosion resistant metal anodes are particularly well-suited for chlorine environments as the titanium substrate is resistant to corrosion. In some embodiments, the anode is a dimensionally stable anode selected from much coated with ruthenium oxide, platinum, or carbon. The total area of the anode can be adjusted based upon reactor size and desired production. The anolyte of electrochemical cell 632 can be any suitable material, including a lithium chloride solution having a concentration of between of about 1% by weight to saturation, preferably between 5% and 40% by weight, more preferably between about 10% and 35% by weight and most preferably between 15 and 25% by weight.

The materials for construction of electrochemical cell 632 can be any material that is chemically resistant to chlorine, activated chlorine, oxygenated chlorine species, and other dissolved species that may exist in brine solutions on the anolyte side and lithium hydroxide on the cathode side. Exemplary materials for the construction of electrochemical cell 632 include polytetrafluoroethylene (PTFE), polyvinylidene fluoride (PVDF), HALAR (alternating co-polymers of ethylene and chlorotrifluoroethylene (CTFE)), and other fluorinated or partially fluorinated materials.

The membrane of electrochemical cell 632 can be any suitable semi-permeable cation selective membrane that selectively passes cations and inhibits the passage of anions. Such membranes are known in the art. One exemplary membrane is Nafion® (E.I. DuPont de Nemours & Co.®), particularly the Nafion® 300, 400, and 900/9000 series of materials. Other suitable membranes can be supplied by Flemion®, however any suitable membrane material can be used provided the material is chemically resistant to both chlorine and lithium hydroxide. The membrane may be placed between the anolyte being electrolyzed and the catholyte.

During operation of electrochemical cell 632, a current density of between about 500 and 10,000 A/m$^2$ can be applied at a voltage of between about 1.5 and 5 volts. In some embodiments, a current density of between about 2000 and 7000 A/m$^2$ is applied. In further embodiments, a current density of between about between 2000 and 4000 A/m$^2$ is applied.

Electrochemical cell 632 may be operated at a temperature of between about 60° and 100° C., preferably between about 70° and 95° C., and more preferably between about 80° and 90° C. Cell 632 can be operated at atmospheric pressure, or slightly above atmospheric pressure.

Operation of electrochemical cell 632 produces lithium hydroxide in solution, and also evolves chlorine and hydrogen gas by products, which can be removed from the electrochemical cell via lines 634 and 636, respectively.

The current efficiency of electrochemical cell 632 can be described in several ways, for the production of lithium hydroxide it is at least about 60%, preferably at least about 70%, more preferably at least about 80%, more preferably at least about 90%, more preferably at least about 95%, and even more preferably at up to about 99.9%. The electrolysis can be operated continually until the lithium hydroxide content reaches about 17% by weight, at which time the lithium hydroxide solution may be removed and supplied to a carbonation reactor. At lithium hydroxide concentrations greater than about 17% by weight, the lithium hydroxide monohydrate in solution can begin to precipitate. Electrochemical cell 632 can also be operated under conditions designed to produce lower concentration lithium hydroxide solutions and the lower concentration lithium hydroxide solution can be recycled to and from the carbonation reactor. In certain embodiments, electrochemical cell 632 can also include a feed line (not shown) for supplying water, low concentration lithium hydroxide, low concentration lithium carbonate, or combinations thereof to the cell. The preferred range of operating conditions lies between 2 and 1% wt. as lithium hydroxide and most preferably in the range of 3 to 8 wt. %.

After lithium chloride-rich stream 624 and/or concentrated lithium chloride stream 630 is processed in the electrochemical cell 632, lithium hydroxide solution 636 is supplied from electrochemical cell 632 to carbonation reactor/absorber 638 and can be contacted with carbon dioxide gas 644, for example, in an up-flow fashion. Carbonation reactor/absorber 638 can include a series of trays or other like means that are designed to allow lithium hydroxide 636 to be supplied to the top of the reactor and flow in a downward fashion through the reactor, thereby contacting up-flowing carbon dioxide gas 644, which can be introduced near the bottom of carbonation reactor/absorber 638. In alternate embodiments, carbonation reactor/absorber 638 can include various mixing means designed to facilitate the efficient mixing of liquids and gases. Optionally, carbonation reactor/absorber 638 can be a jacketed batch reactor having thermostatic heating. The reaction produces lithium carbonate solids. The concentration of the lithium carbonate slurry is preferably at least about 1.5% by weight lithium carbonate, more preferably at least about 6% by weight lithium carbonate. Carbon dioxide can be captured and recycled to carbonation reactor/absorber 638 via line 642.

In certain embodiments, the lithium carbonate can be produced by reaction of lithium chloride with sodium carbonate in water, wherein the mixture is heated, preferably to a temperature of between about 90° C. and 95° C., with stirring. The reaction produces solid lithium carbonate and a sodium chloride solution, wherein the sodium chloride solution can be separated by filtration from the desired lithium carbonate solids.

In certain embodiments, the product of the process is a concentrated solution of lithium chloride, which is produced according to silica management process 612, lithium capture process 618, and lithium concentration 626. It is preferable that the solution produced has a concentration of lithium chloride between 30 wt. % and 42 wt. %, preferably about 36 wt. %. That lithium chloride can be further concentrated to produce crystalline lithium chloride by known evaporation process in the art.

Lithium carbonate containing slurry 640 can be supplied to filter 646, which is operable to separate lithium carbonate containing slurry 640 into water stream 652, which may optionally be resupplied to filter 646, and solid lithium carbonate product 650. Filter 646 can, for example, include a series of screens or filters and water supply 648. Optionally, water can be recycled to the process via line 652. Optionally, lithium carbonate can be concentrated from the lithium carbonate containing slurry 640 by centrifugation or decantation thickening. Water collected during the separation of the solids from the lithium carbonate containing slurry 640 via filter 646 can be supplied to the electrochemical cell 632, or may be recycled to the optional purification steps, or even added back to silica management 612 as a base to increase the pH. In certain embodiments, lithium carbonate solid can be retained on a band or belt filter and supplied to a wash step, wherein hot water, preferably having a temperature of between about 90° C. and 95° C. is used to wash the solids. In certain embodiments, the aqueous solution collected via filter 646 can have a pH of greater than about 9, most likely having a pH between about 10-12. Alternatively, sufficient acid can be added to the aqueous solution to achieve a pH of between about 5 and 8.5, and the acidified water can then be supplied to the intercalated lithium sorbent column(s). Alternatively, the solution can be returned directly to the cathode side of the electrolysis cell without prior neutralization. Still further recycling possibilities include using the strip water in the regeneration of the ion exchange processes to purify the lithium chloride stream.

In some embodiments, the solid lithium carbonate 650 is supplied to a drying station 654, which can optionally include heating means, as well as lines for supplying nitrogen or other inert gases to the drier. Dried lithium carbonate product 656 can then be collected, packaged and transported for further use.

Figure 10:
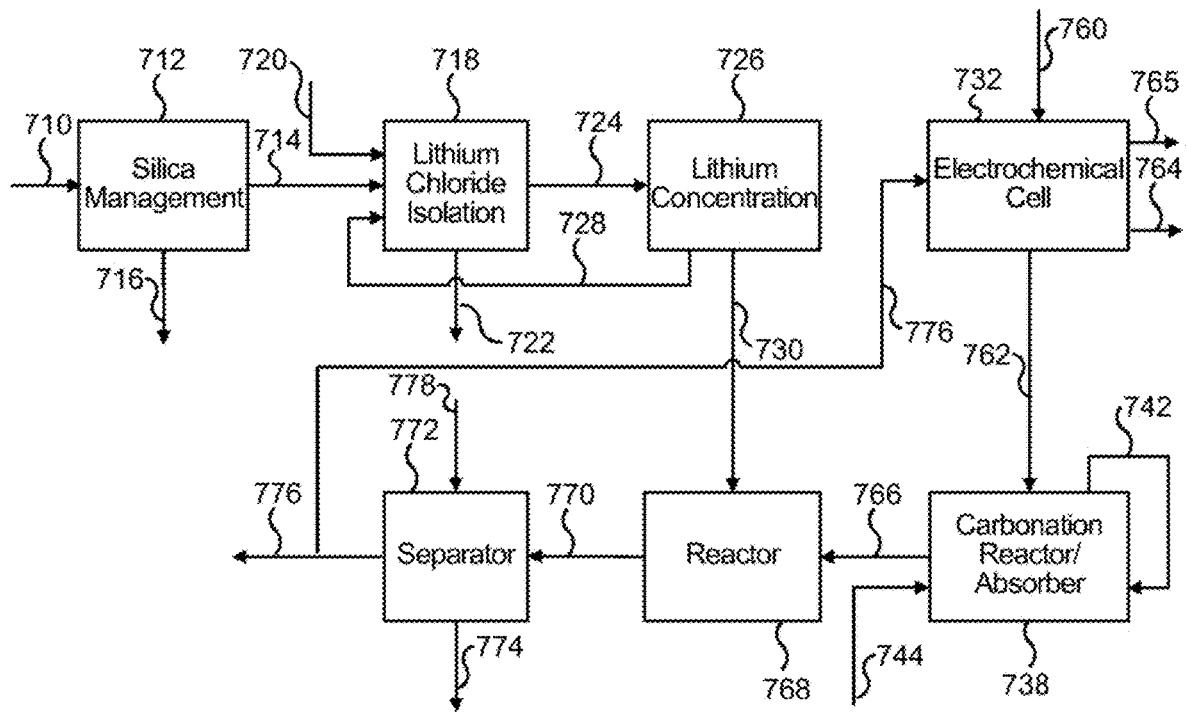
FIG. 10 is a schematic diagram of a second embodiment of system for producing lithium carbonate from a geothermal brine according to one embodiment.

Referring now to FIG. 10, an another embodiment for the production of lithium carbonate is provided. In some embodiments, lithium chloride stream 730 is provided by the process described above and as shown in FIG. 9. In other embodiments, a sodium chloride stream 760 is provided to electrochemical cell 732, which is as described above. Sodium chloride stream 760 is then subjected to electrolysis to produce sodium hydroxide stream 762 and chlorine gas stream 764 and hydrogen gas stream 765. Reaction conditions for the production of sodium hydroxide by electrolysis of sodium chloride are known in the art.

In certain embodiments, the efficiency of the electrolysis of sodium chloride to produce sodium hydroxide is at least about 70%, alternatively at least about 80%, alternatively at least about 90%, or alternatively at least about 95%. In certain embodiments, sodium hydroxide solution 762 is produced in at a concentration of at least about 10% by weight, more preferably at least about 30% by weight, and most preferably about 32 to 35% by weight.

Chlorine gas stream 764 and hydrogen gas stream 765 from electrochemical cell 732 can be combusted and scrubbed with water to generate hydrochloric acid, which may be used within the process, or alternately may be purified, compressed, and sold commercially.

Sodium hydroxide stream 762 is supplied to carbonation reactor/absorber 738, wherein the sodium hydroxide stream 762 is contacted with carbon dioxide steam 744, for example, in an up-flow fashion. Carbonation reactor/absorber 738 can include a series of trays, designed to allow sodium hydroxide stream 762 to be supplied to the top of the reactor and flow in a downward fashion through the reactor, thereby contacting up flowing carbon dioxide gas 744, which can be introduced near the bottom of the reactor, to produce sodium carbonate solution or slurry 766. In alternate embodiments, carbonation reactor/absorber 738 can include various mixing means designed to facilitate mixing of liquids and gases. The concentration of the solution is preferably at least 15% by weight sodium carbonate, more preferably at least 25% by weight sodium carbonate. Carbon dioxide can be captured and recycled to carbonation reactor/absorber 738 via line 742.

Sodium carbonate solution or slurry 766 is supplied to reactor 768 wherein the solution is contacted with lithium chloride solution 730 to produce slurry 770, which includes lithium carbonate and sodium chloride solution. The step of contacting sodium carbonate solution 766 and lithium chloride solution 730 in the reaction vessel can be at a temperature greater than about 60° C., preferably greater than about 80° C., and even more preferably between about 90° C. and 95° C. In certain embodiments, reaction vessel 768 can be a stirred tank reactor. Alternatively, reaction vessel 768 can be a standard crystallizer. In some embodiments, lithium carbonate is present as a precipitate, while sodium chloride remains in aqueous solution.

Slurry 770, which includes solid lithium carbonate and aqueous sodium chloride, is supplied to separator 772, which can include various means for the separation of solids from liquids including, for example, centrifuge, settling tank, filters, screens, and the like, to produce lithium carbonate product stream 774 and sodium chloride brine solution 776. In order to attain improved product quality, the lithium carbonate can be treated to remove sodium, potassium, and/or chloride ions trapped in the interstitial space of the lithium carbonate precipitate, such as by washing with water, preferably hot water, or by like means. In certain embodiments, separator 772 can be a band filter or rotary drum, and can optionally be fed through a counter current wash system for the removal of residual sodium chloride. Separator 772 can also include water inlet 778 to provide water for the washing of the separated solid lithium carbonate. Separator 772 can also include means for drying and/or the removal of water from the solid lithium carbonate, including for example, centrifuge, heaters, blowers, presses, and the like. Separator 772 can include a vacuum filter for removal of water. In certain embodiments, it is desirable to optimize the washing step to both maximize purity of the lithium carbonate while minimizing the amount of water used for washing. Sodium chloride solution 776 can be recycled to electrochemical cell 732 for electrolysis. Lithium carbonate product 774 can have a moisture content of less than about 5% by weight, preferably less than about 2% by weight, and even more preferably less than about 0.5% by weight.

The brine solution 776 from separator 772 can include sodium chloride and lithium carbonate. Generally, depending upon the amount of water utilized in the process and during the wash process, the ratio of sodium chloride to lithium carbonate is at least about 20:1, more preferably at least about 25:1, and even more preferably at least 30:1. In certain embodiments, the ratio of sodium chloride to lithium carbonate in the brine solution can be about 35:1.

In certain embodiments, brine solution 776 can be acidified with hydrochloric acid (not shown) to a pH of less than about 4, preferably about 3, and recycled to electrochemical cell 732. The hydrochloric acid can be supplied from electrochemical cell 732. Such lithium carbonate production method is advantageous because the process eliminates, or nearly eliminates, the production of waste products. Specifically, in certain embodiments, the recycle of unused metal salts, for example sodium chloride, and carbon dioxide, the overall yield can be quantitative or nearly quantitative. Brine solution 776, if required, can be subjected to purification to achieve the desired specifications for sodium chloride anolyte feed to the electrochemical cell 732. As with the process described in detail above in FIG. 9, in certain embodiments, lithium chloride-rich stream 724 and/or concentrated lithium chloride stream 30 can optionally undergo a purification or concentration step prior to being provided to electrochemical cell 732.

Figure 11:
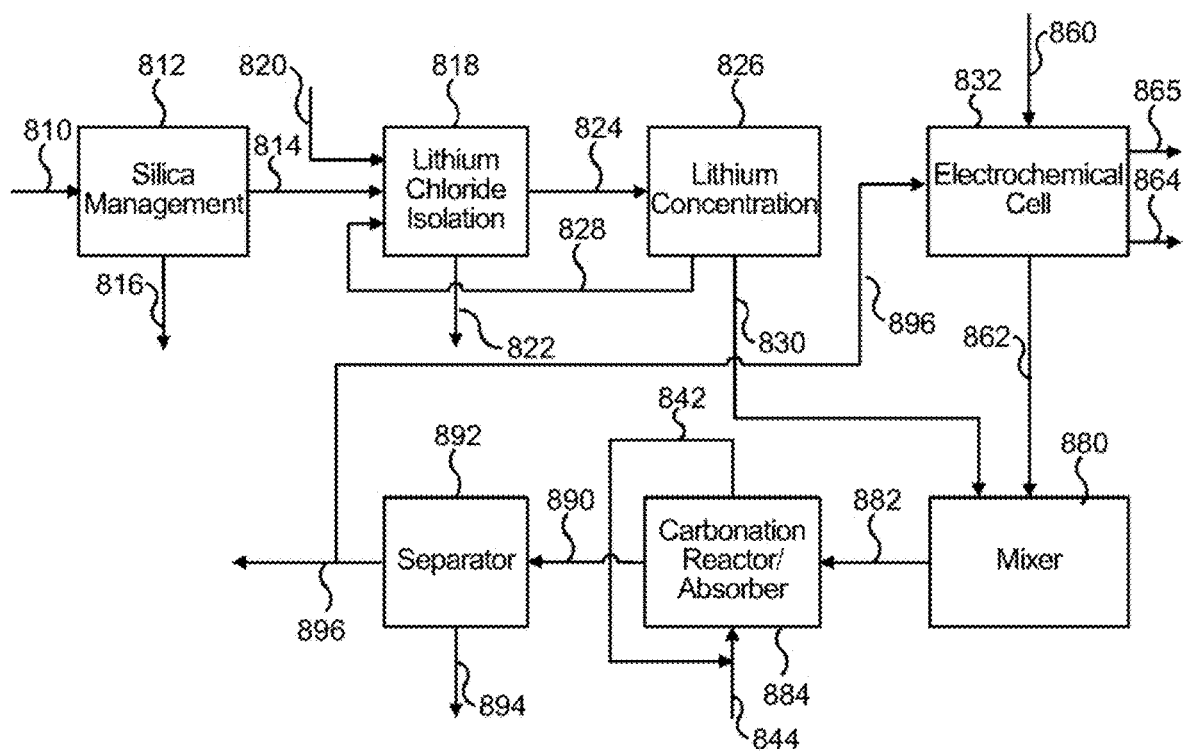
FIG. 11 is a schematic diagram of a third embodiment of system for producing lithium carbonate from a geothermal brine according to one embodiment.

Referring now to FIG. 11 another alternate embodiment for the production of lithium carbonate is provided. The method is a single step process wherein sodium carbonate is produced and reacted with recovered lithium chloride, however may require additional input and produces a waste lithium chloride stream that may include small amounts of lithium carbonate entrained therein.

A lithium chloride stream is provided as described above. In some embodiments, sodium chloride stream 860 is provided to electrochemical cell 832. Sodium chloride stream 860 is subjected to electrolysis to produce sodium hydroxide stream 862, chlorine gas stream 864, and hydrogen gas stream 865, respectively.

Sodium hydroxide stream 862 is supplied to mixer 880, wherein the sodium hydroxide stream is combined and mixed with lithium chloride stream 830. Mixing of sodium hydroxide stream 862 and lithium chloride stream 830 can be done by known means, such as by agitators or mixers, with ultrasonic waves, or by the like. Mixer 880 produces mixed stream 882, which includes sodium hydroxide and lithium chloride in aqueous solution. In certain embodiments, it may be preferred that lithium chloride stream 830 has a concentration of lithium chloride of at least about 20% by weight, more preferably at least about 28% by weight, and even more preferably about 42% by weight. Similarly, in certain embodiments, it may be preferred that sodium hydroxide stream 862 has a concentration of sodium hydroxide of at least about 15% by weight, more preferably at least about 25% by weight, and even more preferably about 35% by weight.

Mixed stream 882 is then supplied to carbonation reactor/absorber 884, which can include a series of trays, designed to allow the mixed stream, which includes lithium chloride and sodium hydroxide, to be supplied to the top of the reactor and flow in a downward fashion through the reactor, thereby allowing the mixed stream to sufficiently contact up-flowing carbon dioxide gas 844, which can be introduced near the bottom of the reactor, to produce a lithium carbonate slurry 890. Preferably, carbonation reactor/absorber 884 is maintained at a temperature of between about 90° C. and 100° C. In alternate embodiments, carbonation reactor/absorber 884 can include various mixing means designed to facilitate mixing of liquids and gases. The concentration of the lithium carbonate, e.g., in stream 890, is preferably at least 4% by weight, more preferably at least 8% by weight lithium carbonate. Carbon dioxide can be recycled to carbonation reactor/absorber 884 via line 842.

Lithium carbonate solution 890 is supplied to separator 892 wherein solid lithium carbonate is predicated out via line 894. A solution that includes sodium chloride and possibly a small amount of lithium carbonate is produced as stream 896. Sodium carbonate solution 890, which includes solid lithium carbonate and aqueous sodium chloride, is supplied to separator means 892, which can include various means for the separation of solids from liquids including, for example, centrifuge, settling tank, filters, screens, and the like. Separator means 892 can also include water inlets and outlets (not shown) for the washing of the separated solid lithium carbonate. Separator 892 can also include means for drying and/or the removal of water from the solid lithium carbonate, including for example, centrifuge, heaters, blowers, presses, and the like. A solid sodium carbonate product is collected via line 894. Optionally, a portion of sodium chloride stream 896 can be recycled to electrochemical cell 832. Optionally, the sodium chloride solution can be recycled to the washing step of the lithium extraction media. In certain embodiments, the sodium chloride required for the process can be generated by the selective crystallization of sodium chloride from the geothermal, Smackover, or other brine.

In certain embodiments, contemplated processes may include means for the neutralization of any lithium carbonate that is included in the sodium chloride solution, such as by neutralizing the solution by adding an effective amount of hydrochloric acid or like acid. In embodiments wherein the lithium carbonate can be effectively removed, the solution can be recycled to the electrochemical cell, however, any lithium carbonate included therein may cause problems with the performance of the electrochemical cell.

In further embodiments for an exemplary forward osmosis system, the lithium containing solution from the lithium capture process is fed to a forward osmosis system using a pump. From forward osmosis system, water is fed to the permeate. The concentrated lithium containing stream is fed to the concentrate. The permeate can then be fed back to the forward osmosis system using the pump. Additionally, the concentrated lithium containing stream can be fed back through the lithium capture process, and to further processing using the forward osmosis system. Where the forward osmosis system involves a cascade system, the lithium containing solution from the lithium capture process is fed to a first forward osmosis system using a first pump. From first forward osmosis system, first water stream is fed to the permeate and first concentrated lithium containing stream is fed to a second forward osmosis system using a second pump. From the second forward osmosis system, the second water stream is fed to permeate and the second concentrated lithium containing stream is fed to third osmosis system using a third pump. From the third forward osmosis system, the third water stream is fed to permeate and the third concentrated lithium containing stream is fed to the concentrate. Various embodiments of the present invention can include any number of forward osmosis systems in cascade function. In some embodiments, there are three forward osmosis systems in cascade. In some embodiments, there are four forward osmosis systems in cascade. In some embodiments, there are five forward osmosis systems in cascade. In some embodiments, there are six forward osmosis systems in cascade. In some embodiments, there are seven forward osmosis systems in cascade. In some embodiments, there are eight forward osmosis systems in cascade. In some embodiments, there are nine forward osmosis systems in cascade. In some embodiments, there are ten forward osmosis systems in cascade.

A person of ordinary skill in the art will understand how to select appropriate forward osmosis membranes to use in the present invention. Forward osmosis membranes can include those supplied by Dow Chemical (Filmtec), Hydranautics, Osmonics (Desal) and Toray. Suitable forward osmosis membranes include those that are typically spiral wound. Suitable forward osmosis membranes are also described in Table 1. The list provided in Table 1 is provided by way of example and is not intended to limit the forward osmosis membranes used in embodiments of the present invention. Potential suppliers along with membrane descriptions are given in Table 1 below. Less preferred membranes are made of cellulose triacetate due to low flux.

TABLE 1

Membrane manufacturer, type and maximum pressure rating.

| TYPE | Membranes | Material | Max pressure | Salt Rejection (NaCl) |
|---|---|---|---|---|
| FILMTEC | SW30-2540 | Polyamide Thin-Film Composite | 68.9 bar | 99.4% |
|  | SW30-4021 |  | 68.9 bar | 99.4% |
|  | SW30-4040 |  | 68.9 bar | 99.4% |

TABLE 1-continued

Membrane manufacturer, type and maximum pressure rating.

| TYPE | Membranes | Material | Max pressure | Salt Rejection (NaCl) |
|---|---|---|---|---|
| | SW30HRLE-4040 | | 82.7 bar | 99.75% |
| | SW30HR-380 | | 68.9 bar | 99.70% |
| | SW30-380 | | 68.9 bar | 99.40% |
| Extra low energy | SW30XLE-400i | | 82.7 bar | 99.70% |
| | SW30HRLE-400i | | 82.7 bar | 99.75% |
| ultra low energy | SW30ULE-400i | | 82.7 bar | 99.70% |
| Boron removal | SW30XHR-400i | | 82.7 bar | 99.75% |
| GE-Osmonics | AD 2540 FF | | 68.9 bar | |
| DESAL | AD 4040 FF | | 82.7 bar | 99.6% |
| | AD 8040F | | 82.7 bar | 99.6% |
| TORAY | TM810 | Cross-linked | 68.9 bar | 99.75% |
| | TM820-370 | Fully aromatic | 68.9 bar | 99.75% |
| | TM820-400 | polyamide | 68.9 bar | 99.75% |
| | TM810L | | 68.9 bar | 99.70% |
| | TM820L-370 | | 68.9 bar | 99.70% |
| | TM820L-400 | | 68.9 bar | 99.70% |
| | TM820H-370 | | 82.7 bar | 99.75% |
| Nitto Denko | SU810 | Cross-linked | 68.9 bar | 99.75% |
| | SU820 | Fully aromatic | 68.9 bar | 99.75% |
| | SU820-FA | polyamide | 68.9 bar | 99.75% |
| | SU820L | | 68.9 bar | 99.75% |
| | SU-820 BCM | | 98 bar | 99.7% |
| HYDRANAUTICS | SWC1-4040 | Composite | 68.9 bar | 99.5% |
| | SWC3+ | Polyamide | 82.7 bar | 99.8% |
| | SWC4+ | | 82.7 bar | 99.8% |
| | SWC5-LD | | 82.7 bar | 99.8% |

In further embodiments, the lithium capture process is optimized by a series of recycle steps associated with the lithium capture process. For instance, a portion of the strip can be recycled. Additionally, a portion of the load can be recycled. The intention of the recycling is to improve the product lithium chloride purity and maximize its concentration prior to purification or concentration steps.

EXAMPLES

Example 1

In a laboratory set-up of an embodiment, two peristaltic pumps were set up to direct the flow of a feed solution and a draw solution through a forward osmosis unit. The selectively permeable membrane used was an AD membrane element from GE Osmonics. The feed solution was a lithium containing solution with the following composition: 2 weight % LiCl and 0.1 weight % NaCl. The draw solution was concentrated brine solution with the following composition: 20% NaCl. Experimental conditions include but are not limited to counter current flow rate of 79-85 mL/min and a temperature of both feed and draw solutions were at room temperature.

Figure 3:
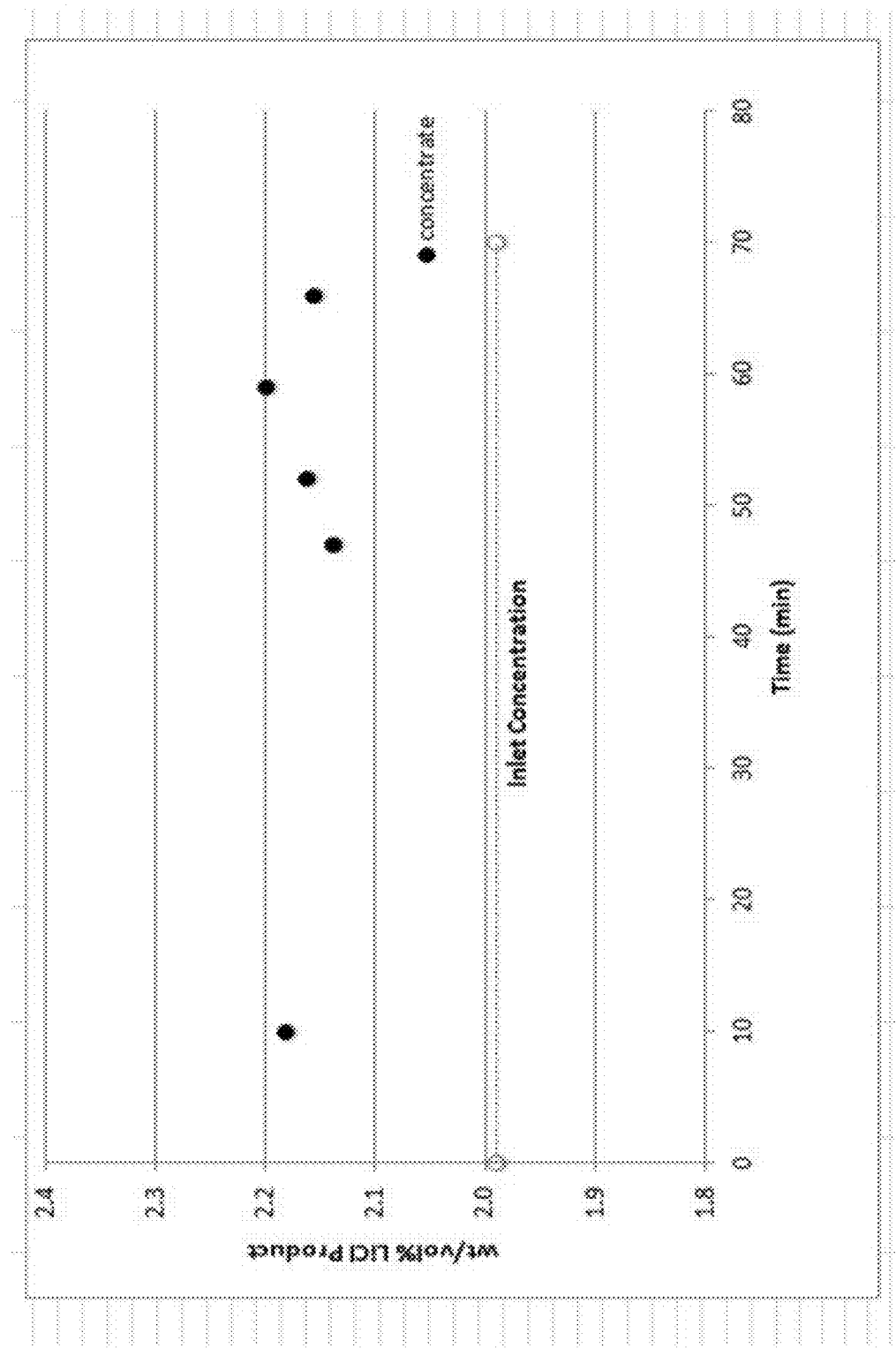
FIG. 3 is a graphical representation of the method of the present disclosure according to some embodiments.

Table 2 below describes the experimental flow, volume, lithium chloride concentration, and sodium chloride concentration in the feed and draw solutions. FIG. 3 is a graphical representation of the concentration of lithium chloride exiting the forward osmosis unit.

| | | FEED | | 2.11 | 0.11 | | | DRAW | | 0.00 | 18.38 |
|---|---|---|---|---|---|---|---|---|---|---|---|
| | | FEED | | | | | | DRAW | | | |
| Time (min) | Time (s) | Volume (mL) | Flow Rate (mL/min) | Sample | % LiCl | % NaCl | Time (s) | Volume (mL) | Flow Rate (mL/min) | Sample | % LiCl | % NaCl |
| 10 | 29.6 | 39 | 79 | C1 | 2.18 | 0.15 | 31 | 43 | 83 | P1 | 0.01 | 18.56 |
| 47 | 31.2 | 38.5 | 74 | C2 | 2.14 | 0.14 | 30.1 | 42.5 | 85 | P2 | 0 | 17.69 |
| 52 | 30.9 | 43 | 83 | C3 | 2.16 | 0.13 | 30.7 | 45 | 88 | P3 | 0.01 | 18.02 |
| 59 | 30.6 | 42 | 82 | C4 | 2.20 | 0.15 | 30.6 | 42.5 | 83 | P4 | 0.01 | 19.17 |
| 66 | 32.3 | 45 | 84 | C5 | 2.16 | 0.13 | 31.2 | 44 | 85 | P5 | 0 | 18.10 |
| | | | | FINAL | 2.17 | 0.14 | | | | | 0 | 18.31 |

Example 2: Further Optimization of Lithium Chloride Capture Step for Feed to Forward Osmosis The following experiments were conducted to determine an optimum process for the lithium capture step, and to provide feed for subsequent forward osmosis process.

A standard lab column measuring 2.6 cm×53 cm was prepared with a sorbent made as described in U.S. Pat. No. 8,901,032. The resulting sorbent was screened to a mean particle size of between about 300 and 500 microns and was then slurried with deionized water and poured into the column and backwashed with saturated salt solution to remove fines. The column was loaded with Li from a geothermal brine.

The geothermal brine was a Hudson Ranch geothermal brine that had been subjected to a silica management process. The silica management process was a continuous process for the management of silica. The silica management system included three stirred reaction vessels provided in series. To the first reaction vessel a geothermal brine was provided at a rate of about 6 gpm. Approximately 30 cfm of air was supplied each reactor and was dispersed through the geothermal brine. After the addition of the air to the first reaction vessel, the pH dropped to between about 2.3 and 3.5. The brine supplied to each of the three reactors is maintained at a temperature of about 95° C.

The geothermal brine from the first reactor was also supplied to the second reactor. An aqueous calcium hydroxide slurry that included between about 15 and 25% by weight calcium hydroxide was supplied to the second reactor at a rate on a wet basis of about 0.5 lb/min. This raised the pH in the second reactor to between about 4.8 and 6.5. The brine in the second vessel in contact with calcium hydroxide slurry was again contacted with air. The addition of calcium hydroxide slurry initiates the precipitation of iron (III) hydroxide and iron silicate. The brine was then supplied from the second vessel to the third reaction vessel where it was again contacted with air. The air to all vessels was supplied at a constant rate, of about 30 cfm. Each of the three reactors included means for stirring to ensure sufficient mixing of the brine, base and air oxidant. The continuous addition of air and base to the reaction vessel results in the precipitation of the iron and silica at rates up to about 0.5 lb/minute, depending upon the concentration of iron and silica in the geothermal brine.

The geothermal brine, including precipitates of iron (III) hydroxide and iron silicate, was then supplied from the third reaction vessel to a clarifier. Water was added to the clarifier. An aqueous flocculant solution of Magnafloc 351, in a concentration between about 0.005% and 1% by weight, such as about 0.025% by weight, was supplied to the clarifier vessel at a rate of about 0.01 gpm.

From the clarifier were produced two streams. First clarifier product stream included the geothermal brine having a reduced concentration of silica and iron, which was then fed to the lithium capture step. Second clarifier product stream included solid silica-iron waste, as well as some geothermal brine.

FIG. 17 shows one embodiment of a system 1400 for extracting lithium in a column from a sorbent with three regenerant solutions. The system 1400 includes a column 1410, a load tank 1420, a depleted brine tank 1425, a recycle cut tank 1430, a product cut tank 1440, and a strip tank 1460. A load (line 1), e.g., a lithium-containing brine solution, was sent to the column 1410. The lithium was stripped from load (line 1) in the column 1410 by treating the column 140 sequentially with three regenerant solutions, starting with the Recycle Cut (line 2), which was used to displace the lithium-containing brine solution from the column 1410, followed by the Recycle Strip (line 5 and line 6), which was used to begin stripping the column and followed finally by a Strip Solution (line 7) of freshly prepared from DI water with 500 mg/kg Li added to complete the elution of Li from the column 1410. Each cycle includes lithium-containing brine solution (line 1), Recycle Cut (line 2), Recycle Strip (lines 5 and 6), and Strip Solution (line 7). The feeds and flow rates are shown in Table 3. This was repeated through at least 50 cycles.

The Recycle Cut (line 2) from the column 1410 is recycled to the load tank 1420. The Recycle Cut (line 3) as shown in Table 3 is defined as the peak area of the strip, where the lithium is the highest concentration, but also where the impurities such as sodium, potassium, calcium, manganese and boron are at their highest. This is recycled and fed into the column 1410 immediately following the loading step. The depleted brine (line 3) that exits from the column 1410 can be sent to depleted brine tank 1425.

The Product Cut (line 4) from the column 1410 is sent to the product cut tank 1440 for further processing (e.g., forward osmosis system). The Product Cut (line 4) as shown in Table 3 is the portion of the strip that is retained (e.g., in the product cut tank 1440) for processing by the forward osmosis system. In some aspects, the Product Cut (line 4) should have an average concentration greater than 1600 mg/kg Li (about 1%) and less than 1000 mg/kg Na and less than 500 mg/kg divalent ions expressed as Ca and B less than 100 mg/kg and preferably less than 50 mg/kg.

The Recycle Strip (line 5) from the column 1410 is sent to the recycle strip tank 1430 and can then be sent as Recycle Strip (line 6) to the column 1410. In some embodiments, the Recycle Strip (line 5) and processed in recycle strip tank 1430 and then sent as a modified Recycle Strip (line 6) to the column 1410. The Recycle Strip (lines 5 and 6) as shown in Table 3 is defined as that portion of the Li strip following the Product Cut (line 4), which has a lithium concentration in the range of 700 to 1500 mg/kg, which is too low to be forwarded to the product cut tank 1440 or forward osmosis system. This Recycle Strip (lines 5 and 6) is recycled to become the feed to produce the product cut as impurities such as sodium, potassium, calcium, manganese and boron are at their lowest.

A Strip Solution (line 7) can be supplied to the column 1410 from a strip tank 1460. The Strip Solution (line 7) can be added to the load (line 1), the Recycle Strip (line 6), or can be independently fed to the column 1410. The Strip Solution (line 7) may comprise freshly prepared from DI water with 500 mg/kg Li added to complete the elution of Li from the column 1410.

The Load Recycle (not shown in FIG. 14) as shown in Table 3 is defined as that portion of the Li loading and strip curves which contains Li at concentrations from 200 up to about 4000 mg/kg where impurities such as sodium, potassium, calcium manganese and boron are at concentrations from about 30% of their concentrations in the feed brine up to their feed brine concentration, which is recycled back to the feed tank, mixed with the geothermal brine and fed to the column during the subsequent load step.

TABLE 3

Feeds and Flow rates to the lithium capture step.

| Column Feed | BV/Cycle | BV Total | Flow Rate (BV/hr) | Sample # | Column Exit |
|---|---|---|---|---|---|
| Load (geothermal brine) | 0.4 | 0.4 | 12 | 1 | Recycle Strip |
| Load (geothermal brine) | 0.4 | 0.8 | 12 | 2 | Load Recycle |
| Load (geothermal brine) | 14.2 | 15 | 12 | 3-12 | Depleted Brine |
| Recycle Cut | 0.4 | 15.4 | 12 | 13 | Depleted Brine |
| Recycle Strip | 0.2 | 15.6 | 2 | 14 | Depleted Brine |
| Recycle Strip | 0.3 | 15.9 | 2 | 15-16 | Load Recycle |
| Recycle Strip | 0.2 | 16.1 | 2 | 17 | Recycle Cut |
| Strip | 0.3 | 16.4 | 2 | 18-20 | Recycle Cut |
| Strip | 1.0 | 17.4 | 2 | 21-30 | Product Cut |
| Strip | 0.7 | 18.1 | 2 | 31-37 | Recycle Strip |

Table 4 shows the concentrations of select components in the geothermal brine before the start of each cycle. This brine was sampled before lithium extraction.

TABLE 4

Geothermal Brine Feed Component concentrations (note: this includes some recycling of the recycle cut).

| Cycle | Li (mg/kg) | Na (mg/kg) | Ca (mg/kg) | B (mg/kg) |
|---|---|---|---|---|
| 52 | 320 | 56000 | 33000 | 435 |
| 53 | 310 | 59000 | 33500 | 460 |
| 54 | 340 | 61000 | 32900 | 440 |
| 55 | 300 | 58000 | 34600 | 445 |
| 56 | 300 | 58000 | 32600 | 440 |
| 57 | 375 | 63000 | 35500 | 465 |
| 58 | 360 | 61000 | 33700 | 455 |
| 59 | 380 | 56000 | 31700 | 420 |
| 60 | 380 | 56000 | 31300 | 425 |
| 61 | 355 | 58000 | 32700 | 425 |
| 62 | 350 | 59000 | 33000 | 425 |
| 63 | 330 | 58000 | 32700 | 435 |

Figure 12:
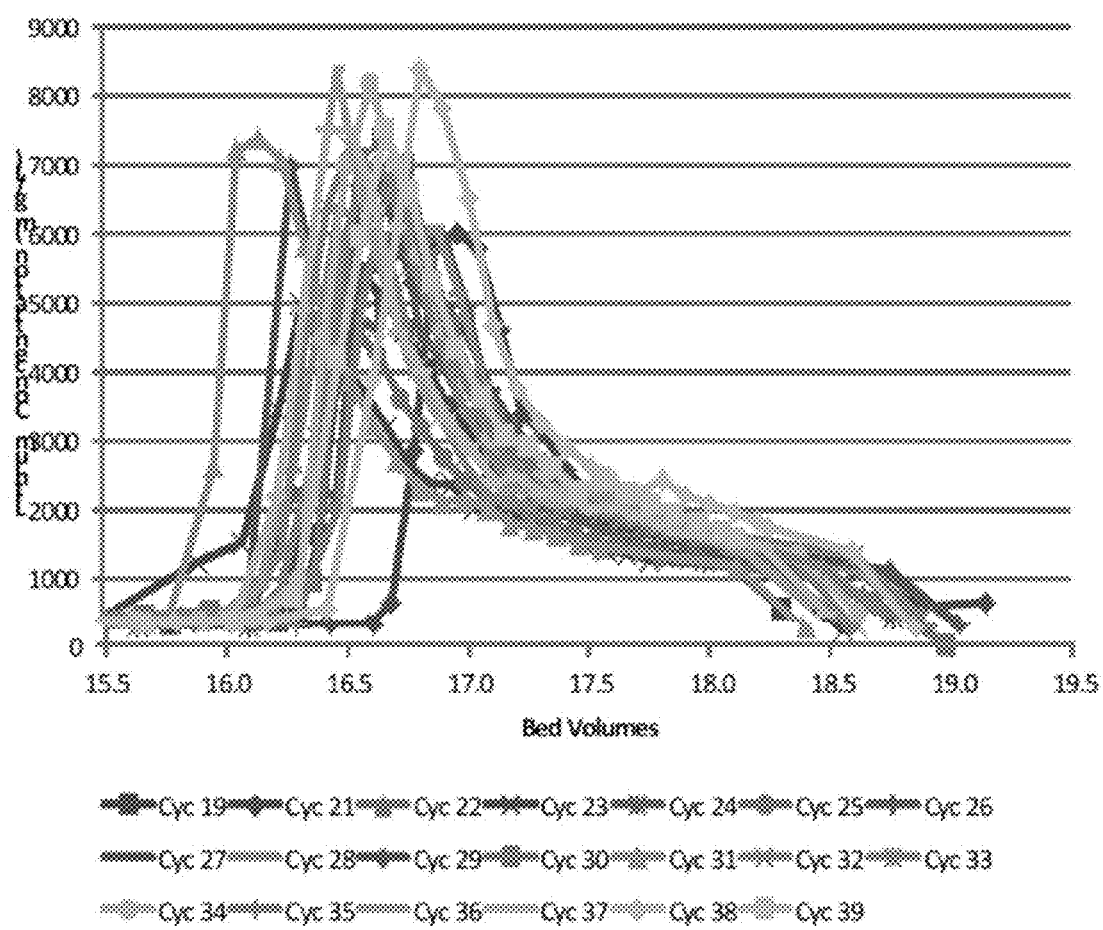
FIG. 12 shows an exemplary series of elution profiles for lithium from a sorbent according to one embodiment.

FIG. 12 shows exemplary lithium loading curves for various cycles. When the lithium concentration is in the range of about 500 to 800 mg/kg it is considered to be the tail fraction. The tail fraction can be recycled to be the feed for the product cut. The product cut is the portion of the strip that is retained for processing by the forward osmosis system. It has an average concentration of the order of about 1600 mg/kg Li and less than about 1000 mg/kg Na and less than about 500 mg/kg and preferably less than 200 divalent ions expressed as calcium equivalents and boron is less than about 100 mg/kg and preferable less than about 50 mg/kg. The recycle cut is the peak area of the strip, where the lithium is the highest concentration, but also where the impurities such as sodium, potassium, calcium, manganese and boron are at their highest. This is recycled and fed into the column instead of the wash step described in the example above.

Table 5 shows the concentrations in the lithium chloride product cut post lithium extraction for cycles 52 to 63. This product cut is fed directly to a forward osmosis process, or to a purification process, then to forward osmosis process.

TABLE 5

Component concentrations.

| Cycle number | LiCl (wt %) | LiCl (mg/kg) | NaCl (mg/kg) | Ca (mg/kg) | B (mg/kg) |
|---|---|---|---|---|---|
| 52 | 1.5% | 15,000 | 268 | 174 | 47 |
| 53 | 1.3% | 13,000 | 334 | 182 | 29 |
| 54 | 1.4% | 14,000 | 465 | 176 | 31 |
| 55 | 1.2% | 12,000 | 293 | 127 | 20 |
| 56 | 1.3% | 13,000 | 77 | 11 | 26 |
| 57 | 1.2% | 12,000 | 69 | 92 | 16 |
| 58 | 1.4% | 14,000 | 528 | 188 | 35 |
| 59 | 1.3% | 13,000 | 703 | 206 | 32 |
| 60 | 1.6% | 16,000 | 306 | 180 | 44 |
| 61 | 1.4% | 14,000 | 145 | 131 | 35 |
| 62 | 1.4% | 14,000 | 144 | 137 | 39 |
| 63 | 1.2% | 12,000 | 81 | 109 | 28 |

Figure 13:
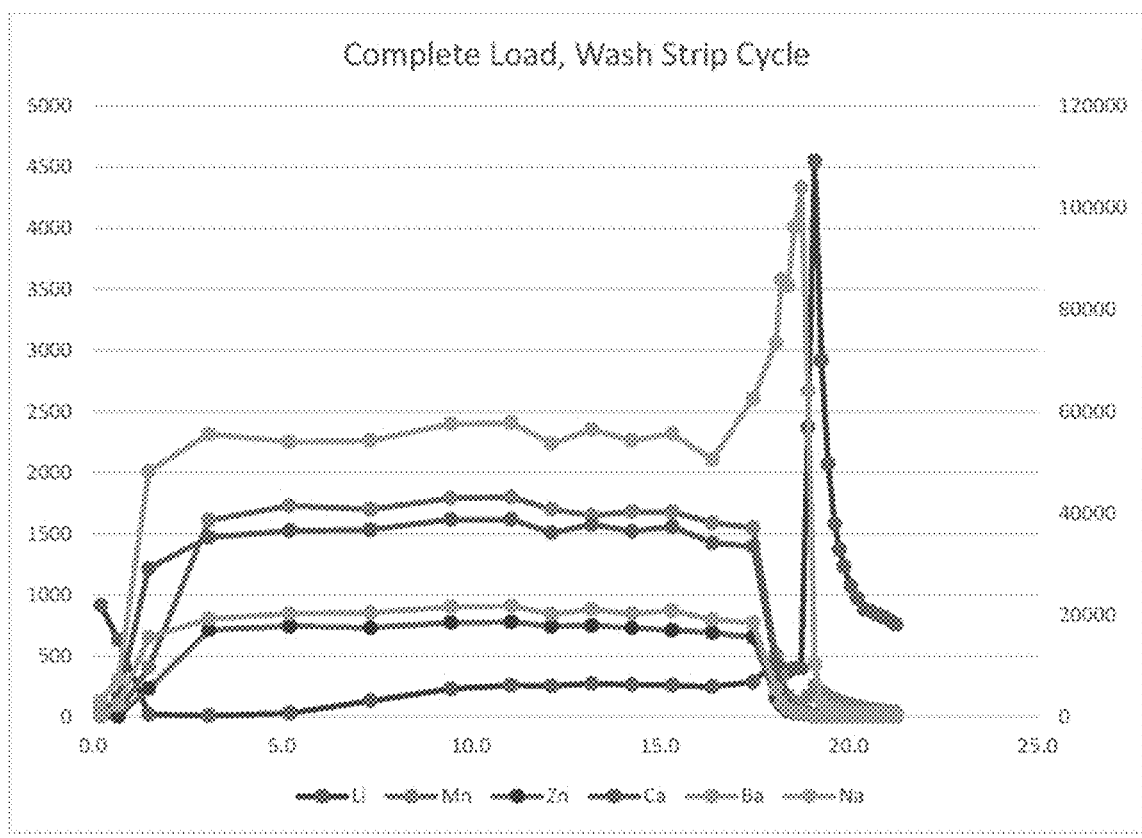
FIG. 13 shows an exemplary series of elution profiles for lithium and other ions from a sorbent during load, wash, and strip cycles.

Example 3: Additional Examples for Optimization of Lithium Chloride Capture Step for Feed to Forward Osmosis Conventional/Comparative:

A column was loaded with sorbent produced by methods described in U.S. Pat. No. 8,901,032 B1 to a depth of 48 cm the column diameter was 2.64 cm. Lithium was extracted and recovered from the geothermal brine according to the following sequence. The flow rate of geothermal brine, the (load), was 60 ml/min and 5.065 liters of geothermal brine were passed through the column. This was followed by a solution of sodium chloride (wash) 62 mol/min until 0.3 liters of solution was passed and finally a strip solution of water containing 500 mg/kg was passed through the column at a rate of 12 ml/min until 0.91 of solution had been passed through the column. The input data to the column is shown in Table 6, the output data in Table 7 and FIG. 13 (Li Concentration at the outlet read primary Y axis for Li, Mn, Zn, Ba and Zn, read secondary Y axis to read Na, K and Ca) and FIG. 14.

Figure 14:
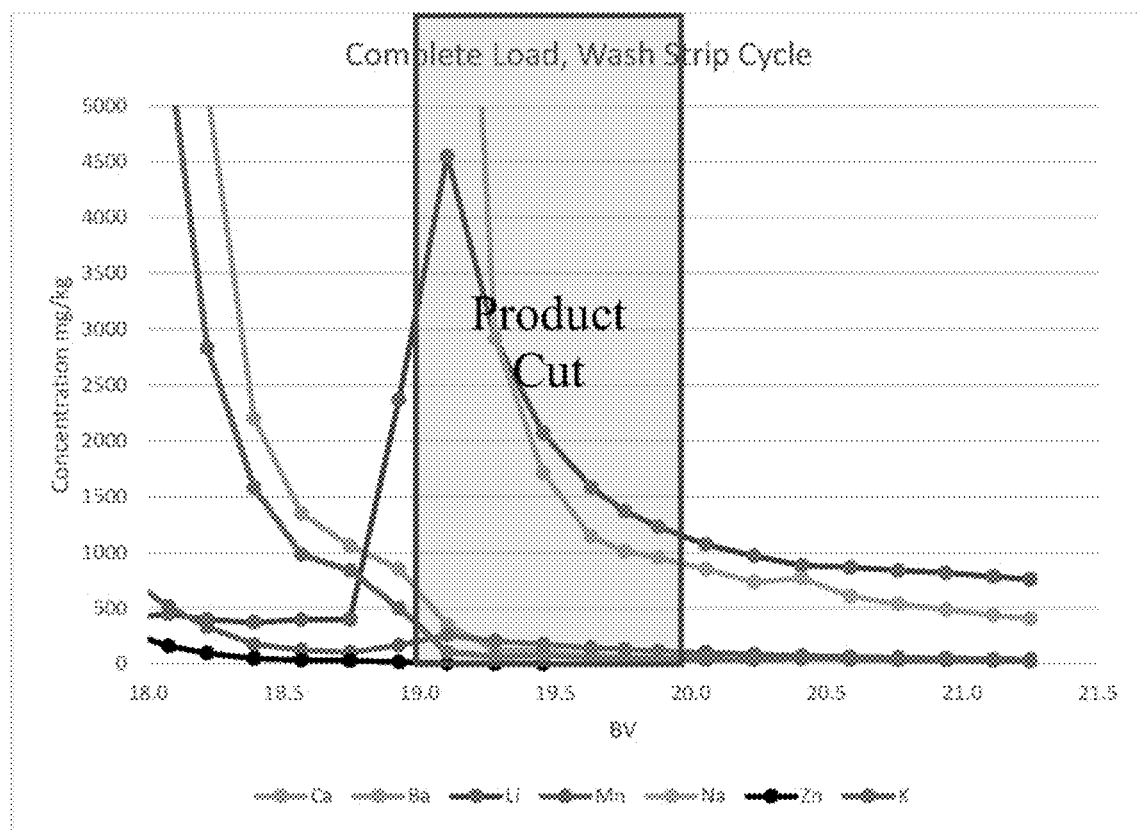
FIG. 14 shows an exploded view of a portion of FIG. 13.

FIG. 14 illustrates one embodiment in which the area of peak lithium concentration includes the most concentrated lithium solution that is extracted from the sorbent. In some embodiments, however, the area of peak lithium concentration can also include impurities. For example, the area of peak lithium concentration may include a large amount of sodium and potentially other impurities (e.g., calcium and potassium). The area of peak lithium concentration may have the highest concentration of the lithium, but also the impurities such as sodium, potassium, calcium, manganese and boron are at their highest in this area.

In some embodiments, the process may include recycling a cut from the area of peak lithium concentration (also referred herein as "recycle cut") to remove these impurities to produce a purer lithium solution. The recycle can be taken from the area peak lithium concentration during the stripping process. By employing one or more recycles of the peak lithium concentration solution, the peak lithium concentration can be shifted to a later time in the strip cycle. Therefore, the process can produce a purer concentrated lithium stream (see e.g., FIG. 16 "product cut") which can be fed to the forward osmosis unit.

Figure 16:
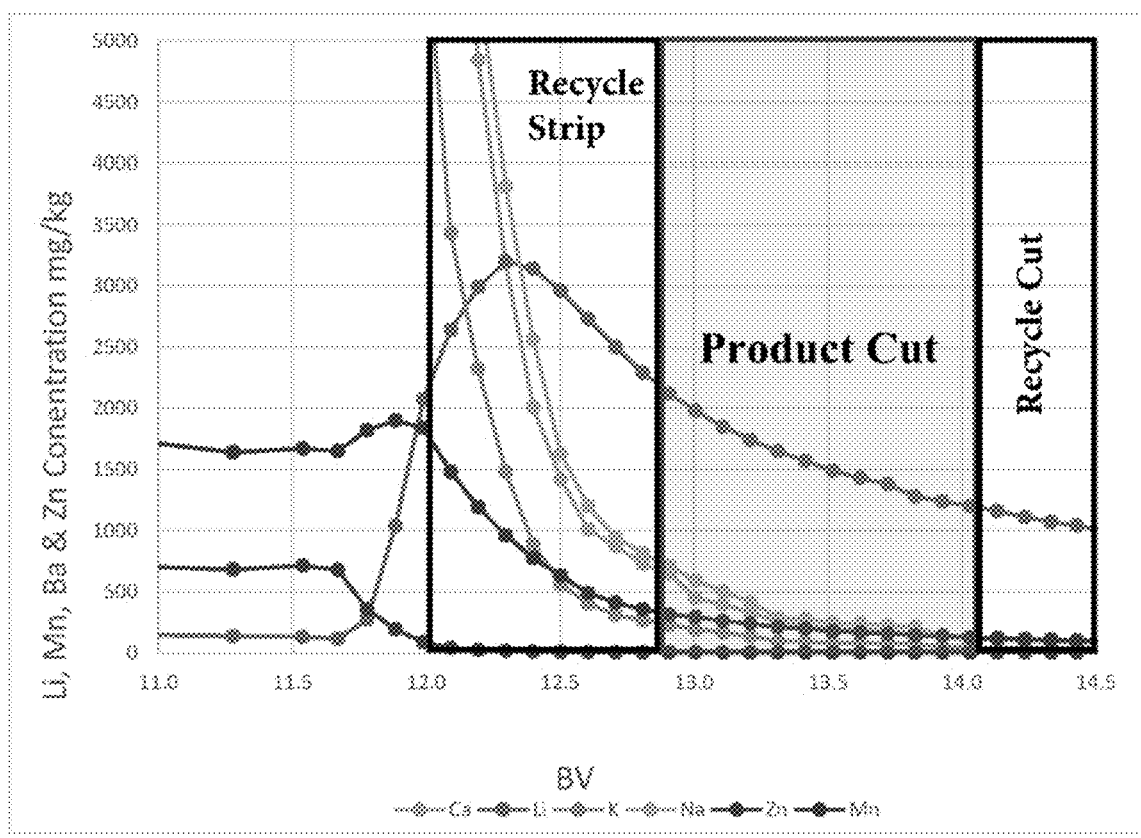
FIG. 16 shows an exploded view of a portion of FIG. 15.

For example, comparing FIG. 14 with FIG. 16, the lithium concentration is significantly higher in FIG. 16 between Bed Volume (BV) 13 and 14, whereas a similar position in FIG. 14 (roughly between BV 19.5 and 20.5) has a lower concentration of lithium and significantly higher concentration of sodium. The high sodium content prevents the use of forward osmosis on these solutions as forward osmosis has limits on operating pressures to about 1000 to 2000 psi. The high sodium content results in a higher osmotic pressure which has to be overcome for the forward osmosis to have any practical utility. Thus, by utilizing one or more recycle cuts of the highly concentrated lithium solution as part of the stripping process (e.g., stripping lithium from the sorbent), the area of peak lithium concentration can be shifted in the strip cycle to produce a purer lithium solution with less impurities which can now be fed to the forward osmosis unit.

TABLE 6

| 0.28 | Flow Rate kg hr$^{-1}$ | Flow Rate ml min$^{-1}$ | Cum. Volume 1 | B | Ba | Ca | Cu | K | Li | Mg | Mn | Na | Pb | Rb | S | Si | Sr | Zn |
|---|---|---|---|---|---|---|---|---|---|---|---|---|---|---|---|---|---|---|
| Feed Brine | 4.32 | 59.9 | 5.090 | 452 | 38.7 | 28900 | 4.8 | 13400 | 290 | 70.9 | 1030 | 41100 | 97.5 | 235 | 318 | 4.38 | 500 | 563 |
| Feed Wash | 5.10 | 62.0 | 0.310 | <5.0 | <1 | <5.0 | <0.5 | 32.3 | 521 | <5.0 | <0.5 | 91100 | <2 | <10.0 | <20.0 | <2 | <0.5 | <1 |
| Feed Strip | 0.72 | 11.9 | 0.901 | <5.0 | <1 | <5.0 | <0.5 | <10.0 | 491 | <5.0 | <0.5 | 35.9 | <2 | <10.0 | <20.0 | <2 | <0.5 | <1 |

TABLE 7

| Time min | Flow Rate ml min$^{-1}$ | Cum Volume ml | B | Ba | Ca | Cu | K | Li | Mg | Mn |
|---|---|---|---|---|---|---|---|---|---|---|
| 2.5 | 46.0 | 115 | 9.25 | <10 | 412 | <0.5 | 265 | 914 | <5.0 | 60.4 |
| 5 | 60.0 | 265 | 6.51 | 2.69 | 3780 | <0.5 | 2250 | 631 | <5.0 | 40.8 |
| 10 | 60.0 | 565 | 159 | 27.4 | 29200 | 0.769 | 15600 | 20.9 | 38 | 403 |
| 20 | 60.0 | 1165 | 424 | 35.9 | 35300 | 3.61 | 19300 | <10.0 | 65.5 | 1610 |
| 30 | 60.5 | 1770 | 443 | 37.2 | 36600 | 5.11 | 20300 | 31 | 67.8 | 1730 |
| 40 | 60.0 | 2370 | 447 | 37.2 | 36800 | 4.88 | 20500 | 132 | 66.8 | 1700 |
| 50 | 60.0 | 2970 | 457 | 39.5 | 38800 | 4.75 | 21600 | 229 | 70.7 | 1790 |
| 55 | 60.0 | 3270 | 456 | 39.1 | 38800 | 4.95 | 21800 | 260 | 70.1 | 1800 |
| 60 | 60.0 | 3570 | 430 | 36.3 | 36200 | 4.21 | 20200 | 253 | 65.1 | 1700 |
| 65 | 60.0 | 3870 | 444 | 37.8 | 37800 | 4.44 | 21100 | 274 | 67.9 | 1650 |
| 70 | 60.0 | 4170 | 425 | 36.2 | 36500 | 4.65 | 20300 | 264 | 65.7 | 1680 |
| 75 | 60.0 | 4470 | 445 | 38.1 | 37400 | 4.13 | 20900 | 259 | 68 | 1680 |
| 80 | 60.0 | 4770 | 402 | 33.4 | 34200 | 3.8 | 19100 | 248 | 60.6 | 1590 |
| 85 | 62.0 | 5080 | 435 | 34.8 | 33500 | 4.86 | 18500 | 286 | 60.9 | 1550 |
| 89 | 7.8 | 5111 | 253 | 11.6 | 10200 | 3.04 | 5480 | 449 | 19.6 | 512 |
| 93 | 12.3 | 5160 | 195 | 6.45 | 5140 | 2.5 | 2830 | 396 | 10.4 | 333 |
| 97 | 12.1 | 5209 | 119 | 3.16 | 2200 | 2.36 | 1580 | 371 | <5.0 | 176 |
| 101 | 12.5 | 5259 | 86.5 | 2.22 | 1350 | 1.79 | 980 | 396 | <5.0 | 124 |
| 105 | 12.8 | 5310 | 68.5 | 1.83 | 1060 | 2.34 | 838 | 398 | <5.0 | 104 |
| 109 | 12.6 | 5360 | 52.2 | 1.51 | 852 | 1.33 | 500 | 2370 | 5.32 | 167 |
| 113 | 12.4 | 5410 | 36.5 | <1.0 | 348 | 0.674 | 107 | 4550 | 8.08 | 258 |
| 117 | 12.5 | 5460 | 22 | <1.0 | 127 | <0.5 | 62.4 | 2920 | <5.0 | 205 |
| 121 | 12.5 | 5510 | 15.1 | <1.0 | 115 | 0.51 | 78.8 | 2070 | <5.0 | 173 |
| 125 | 12.4 | 5559 | 11.1 | <1.0 | 72.4 | <0.5 | 49.9 | 1580 | <5.0 | 143 |
| 129 | 5.0 | 5579 | 9.1 | <1.0 | 64.5 | <0.5 | 46 | 1370 | <5.0 | 130 |
| 133 | 12.4 | 5629 | 7.09 | <1.0 | 57.6 | <0.5 | 40.8 | 1230 | <5.0 | 111 |
| 137 | 12.5 | 5679 | 6.26 | <1.0 | 51.6 | <0.5 | 39 | 1070 | <5.0 | 101 |
| 141 | 12.5 | 5729 | <5.0 | <1.0 | 47.2 | <0.5 | 34.7 | 968 | <5.0 | 85.4 |
| 145 | 12.5 | 5779 | <5.0 | <1.0 | 65.5 | <0.5 | 46.8 | 881 | <5.0 | 72.4 |
| 149 | 12.5 | 5829 | <5.0 | <1.0 | 55.7 | <0.5 | 41.7 | 866 | <5.0 | 62.8 |
| 153 | 12.5 | 5879 | <5.0 | <1.0 | 49.2 | <0.5 | 34.2 | 836 | <5.0 | 55 |
| 157 | 12.3 | 5928 | <5.0 | <1.0 | 47.9 | <0.5 | 33.7 | 816 | <5.0 | 49.1 |
| 161 | 12.4 | 5977 | <5.0 | <1.0 | 39.5 | 0.562 | 27.1 | 783 | <5.0 | 41.3 |
|  |  | 6005 | <5.0 | <1.0 | 35.7 | <0.5 | 24.8 | 759 | <5.0 | 39.4 |

| Time min | Na | Pb | Rb | S | Si | Sr | Zn | |
|---|---|---|---|---|---|---|---|---|
| 2.5 | 3130 | <2.0 | <10.0 | <2.0 | <2.0 | 6.19 | 6.6 | Load |
| 5 | 7420 | <2.0 | 16.5 | 30.7 | <2.0 | 55.5 | 2.77 | |
| 10 | 48300 | 48.2 | 175 | 256 | <2.0 | 404 | 233 | |
| 20 | 55600 | 97.3 | 216 | 308 | <2.0 | 492 | 713 | |
| 30 | 54100 | 97.3 | 224 | 305 | <2.0 | 504 | 743 | |
| 40 | 54300 | 102 | 227 | 303 | <2.0 | 506 | 731 | |
| 50 | 57600 | 104 | 243 | 318 | 2.49 | 536 | 772 | |
| 55 | 57800 | 107 | 243 | 318 | 2.58 | 536 | 777 | |
| 60 | 53700 | 94.5 | 225 | 296 | 2.44 | 500 | 742 | |
| 65 | 56500 | 101 | 231 | 309 | 2.66 | 525 | 748 | |
| 70 | 54300 | 96.9 | 223 | 291 | 2.79 | 508 | 729 | |
| 75 | 55700 | 97.7 | 234 | 304 | 2.95 | 519 | 710 | |

TABLE 7-continued

| | | | | | | | | |
|---|---|---|---|---|---|---|---|---|
| 80 | 50600 | 89.7 | 203 | 269 | 2.23 | 473 | 689 | |
| 85 | 62600 | 93.1 | 212 | 284 | 2.82 | 473 | 650 | |
| 89 | 73400 | 31.6 | 62.2 | 85.8 | 2.06 | 141 | 160 | Wash |
| 93 | 85900 | 18.7 | 29.8 | 45 | <2.0 | 71.5 | 95.5 | |
| 97 | 84700 | 9.47 | 11.6 | 21.3 | <2.0 | 30.9 | 47.7 | |
| 101 | 96100 | 6.2 | <10.0 | <20.0 | <2.0 | 18.9 | 32.7 | |
| 105 | 104000 | 5.63 | <10.0 | <20.0 | <2.0 | 15.2 | 29.2 | |
| 109 | 64100 | 2.58 | <10.0 | <20.0 | <2.0 | 12.1 | 16.3 | Product Cut |
| 113 | 10300 | <2.0 | <10.0 | <20.0 | <2.0 | 4.56 | 3.13 | |
| 117 | 2920 | <2.0 | <10.0 | <20.0 | <2.0 | 1.9 | 1.38 | |
| 121 | 1710 | <2.0 | <10.0 | <20.0 | <2.0 | 1.76 | 1.63 | |
| 125 | 1140 | <2.0 | <10.0 | <20.0 | <2.0 | 1.13 | <1.0 | |
| 129 | 1010 | <2.0 | <10.0 | <20.0 | <2.0 | 0.909 | <1.0 | |
| 133 | 950 | <2.0 | <10.0 | <20.0 | <2.0 | 0.825 | <1.0 | |
| 137 | 849 | <2.0 | <10.0 | <20.0 | <2.0 | 0.676 | <1.0 | |
| 141 | 733 | <2.0 | <10.0 | <20.0 | <2.0 | 0.616 | <1.0 | Recycle to |
| 145 | 768 | <2.0 | <10.0 | <20.0 | <2.0 | 0.838 | <1.0 | Strip Feed |
| 149 | 606 | <2.0 | <10.0 | <20.0 | <2.0 | 0.748 | <1.0 | |
| 153 | 537 | <2.0 | <10.0 | <20.0 | <2.0 | 0.636 | <1.0 | |
| 157 | 485 | <2.0 | <10.0 | <20.0 | <2.0 | 0.628 | <1.0 | |
| 161 | 436 | <2.0 | <10.0 | <20.0 | <2.0 | <0.5 | <1.0 | |
| | 405 | <2.0 | <10.0 | <20.0 | <2.0 | <0.5 | <1.0 | |

Figure 15:
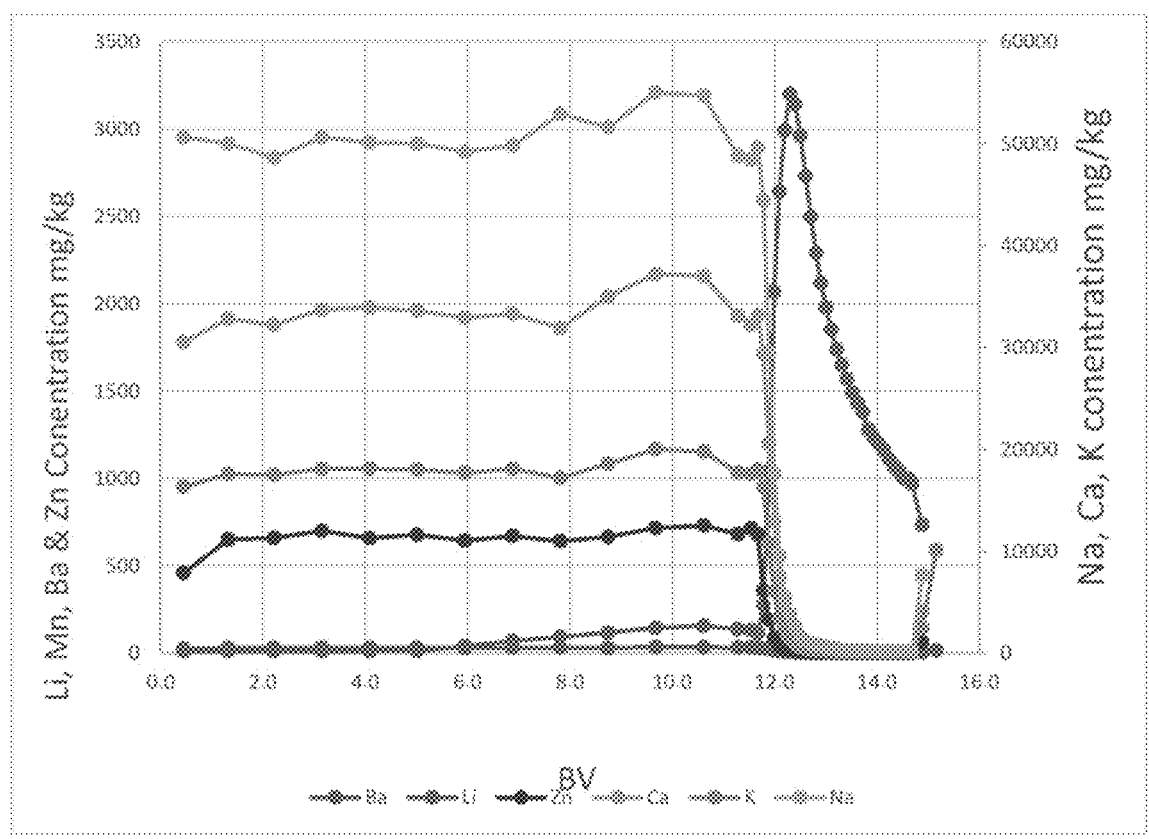
FIG. 15 shows an exemplary series of elution profiles for lithium and other ions from a sorbent during load, wash, and strip cycles according to one embodiment.

Inventive Methods Suitable for Combination with Forward Osmosis:

A column was loaded with sorbent produced by methods described in U.S. Pat. No. 8,901,032 B1 to a depth of 19.3 inches the column diameter was 1 inch. Lithium was extracted and recovered from the geothermal brine according to the following sequence. The flow rate of geothermal brine, the (load), was 50 ml/min and 3.058 liters of geothermal brine were passed through the column. Subsequently, recycle cut was fed to the column according to flow diagram in FIG. 8 at the same flow rate for a total of 0.1 liters. Subsequently, recycle strip was fed to the column at 11 ml/min to a total of 0.261 and finally feed strip solution was fed to the column. The results of the extraction and resulting strip procedure are shown in FIG. 15 (Li Concentration at the outlet read primary Y axis for Li, Mn, Zn, Ba and Zn, read secondary Y axis to read Na, K and Ca) and FIG. 16 along with Table 8.

TABLE 8

| | Flow Rate/ ml min- | Cumulative Volume/l | BV | B | Ba | Ca | Cd | Cu | Fe | K |
|---|---|---|---|---|---|---|---|---|---|---|
| | | | | | | mg/kg | | | | |
| Feed Brine | 50.1 | 3.058 | 11.4 | 405 | 32 | 34700 | 3 | 4 | <1.0 | 18400 |
| Feed Recycle Cut | 50.1 | 0.100 | 0.4 | 229 | 3 | 1470 | <0.5 | <0.5 | <1.0 | 613 |
| Feed Recycle Strip | 10.9 | 0.261 | 1.0 | 29 | <1.0 | 84 | <0.5 | <0.5 | <1.0 | 40 |
| Feed Strip | 9.2 | 0.519 | 1.9 | <5.0 | <1.0 | <5.0 | <0.5 | <0.5 | <1.0 | <10.0 |
| | | 3.937 | 14.7 | | | | | | | |
| Depleted Brine | | 1.970 | 7.3 | 356 | 30 | 33000 | 3 | 4 | <1.0 | 17500 |
| Lag Brine | | 1.259 | 4.7 | 381 | 29 | 31800 | 3 | 5 | <1.0 | 16900 |
| Recycle Brine | | 0.155 | 0.6 | 164 | 5 | 4880 | <0.5 | 1 | <1.0 | 2590 |
| Recycle Cut | | 0.110 | 0.4 | 268 | 4 | 1850 | <0.5 | <0.5 | <1.0 | 841 |
| Product Cut | | 0.327 | 1.2 | 102 | <1.0 | 367 | <0.5 | <0.5 | <1.0 | 149 |
| Recycle Strip | | 0.219 | 0.8 | 40 | <1.0 | 108 | <0.5 | <0.5 | <1.0 | 47 |

| | Li | Mg | Mn | Na | Pb | Rb | S | Si | Sr | Zn |
|---|---|---|---|---|---|---|---|---|---|---|
| | | | | | mg/kg | | | | | |
| Feed Brine | 259 | 63 | 1690 | 57600 | 82 | 215 | 263 | 3 | 481 | 656 |
| Feed Recycle Cut | 2750 | 9 | 640 | 1870 | <2.0 | <10.0 | <20.0 | <2.0 | 22 | 6 |
| Feed Recycle Strip | 979 | <5.0 | 85 | 114 | <2.0 | <10.0 | <20.0 | <2.0 | 1 | <1.0 |

TABLE 8-continued

|  | | | | | | | | | | |
|---|---|---|---|---|---|---|---|---|---|---|
| Feed Strip | 519 | <5.0 | <0.5 | <10.0 | <2.0 | <10.0 | <20.0 | <2.0 | <0.5 | <1.0 |
| Depleted Brine | 16 | 58 | 1530 | 53100 | 82 | 204 | 245 | <2.0 | 457 | 648 |
| Lag Brine | 144 | 59 | 1580 | 53400 | 78 | 198 | 237 | <2.0 | 444 | 603 |
| Recycle Brine | 1400 | 15 | 551 | 7420 | 7 | 20 | 35 | <2.0 | 74 | 54 |
| Recycle Cut | 3000 | 12 | 721 | 2360 | <2.0 | <10.0 | <20.0 | <2.0 | 30 | 9 |
| Product Cut | 1800 | <5.0 | 241 | 467 | <2.0 | <10.0 | <20.0 | <2.0 | 6 | 2 |
| Recycle Strip | 1100 | <5.0 | 114 | 128 | <2.0 | <10.0 | <20.0 | <2.0 | 1 | <1.0 |

Note that the use of a sodium chloride wash is not economically and results in a solution with too high a sodium content. Without the wash then the lithium chloride stream is contaminated with Na, Ca and K at too high an average concentration. Indeed, it should be appreciated that a very significant reduction in sodium ions is observed, while ions such as Mn and Ca are similar in concentration (which can be purified by known chemical means such as pH adjustment with lithium hydroxide and carbonate and ion exchange to remove impurities). In the comparative example, the concentration sodium ions is 16 g/kg or 0.7 Molal where as in the Li concentration is 2.6 g/kg equivalent to 0.36 Molal. It is shown that the osmotic pressure will be higher under these conditions and that the high sodium content will prevent satisfactory concentration by forward osmosis. Furthermore there is a significant consumption of salt in the salt wash methodology. In contrast, in the inventive method the amount of sodium in the product cut is 0.46 g/kg 0.02 Molal against the 1.8 g/kg for Li which is 0.25 Molal. Hence the osmotic pressure is almost entirely a function of the Li content and not the sodium content and it will therefore be economically feasible to concentrate the LiCl from 0.5% to approximately 5 wt. % LiCl. Table 9 provides a typical product composition for the comparative method (example 101) and the inventive method (example 102).

TABLE 9

| Product Cut | B | Ba | Ca | Cd | Cu | Fe | K | Li | Mg | Mn | Na | Pb | Rb | S | Si | Sr | Zn |
|---|---|---|---|---|---|---|---|---|---|---|---|---|---|---|---|---|---|
|  | | | | | | | | mg/kg | | | | | | | | | |
| Example 101 | 17 | 1 | 299 | | 1 | | 159 | 2580 | 6 | 183 | 16123 | 2 | 10 | 20 | 2 | 4 | 5 |
| Example 102 | 102 | <1.0 | 367 | <0.5 | <0.5 | <1.0 | 149 | 1800 | <5.0 | 241 | 467 | <2.0 | <10.0 | <20.0 | <2.0 | 6 | 2 |

Among other benefits, it should therefore be appreciated that recycling of a lithium rich fraction as described above has numerous benefits, particularly where the resultant lithium solution will be subjected to a downstream forward osmosis concentration step. Among other things, conventional elution methods that will take advantage of the lithium peak area (and even areas trailing the peak) as illustrated in FIG. 14 will necessarily be also rich in sodium. Therefore, high lithium recovery is associated with high sodium concentrations. Unfortunately, such high sodium concentrations will adversely affect forward osmosis as sodium substantially contributes to the osmotic pressure. As can be seen from the table above, sodium ions are in six-fold excess over lithium ions using conventional elution. In contrast, when the product (or fractions at least partially overlapping with the product cut) is recycled to the sorbent, the ionic strength is still sufficient to maintain (and even additionally bind) lithium on the sorbent, in large part due to elevated lithium concentration relative to sodium. Viewed from another perspective, ionic strength is gained by an increase in lithium at concomitant decrease of sodium, which favorably affects the product composition upon elution with a suitable eluent low or depleted in sodium. As can also be taken from the table above, the lithium concentration is now approximately four-fold over the sodium concentration. Therefore, partial recycle as presented above allows for an increase in ratio between lithium and undesirable other cations (and especially sodium) while maintaining overall lithium recovery.

The methods described herein are suitable for the recovery of lithium from brines or solutions having low or high lithium concentrations, in addition to brines or solutions that include significant concentrations of other ions, including multivalent ions.

As is understood in the art, not all equipment or apparatuses are shown in the figures. For example, one of skill in the art would recognize that various holding tanks and/or pumps may be employed in the present method.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and lower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

Embodiments include many additional standard components or equipment that enables and makes operable the described apparatus, process, method and unit. Examples of such standard equipment known to one of ordinary skill in the art includes heat exchanges, pumps, blowers, reboilers, steam generation, condensate handling, membranes, single and multi-stage compressors, separation and fractionation equipment, valves, switches, controllers and pressure-, temperature-, level- and flow-sensing devices. Operation, control and performance of portions of or entire steps of a process or method can occur through human interaction, pre-programmed computer control and response units, or combinations thereof.

Moreover, the foregoing has broadly outlined certain objectives, features, and technical advantages of the present invention and a detailed description of the invention so that embodiments of the invention may be better understood in light of features and advantages of the invention as described herein, which form the subject of certain claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages are better understood from the description above when considered in connection with the accompanying figures. It is to be expressly understood, however, that such description and figures are provided for the purpose of illustration and description only and are not intended as a definition of the limits of the present invention. It will be apparent to those skilled in the art that various modifications and changes can be made within the spirit and scope of the invention as described in the foregoing specification.

We claim:

1. A method of extracting lithium from a lithium containing solution, comprising:
   providing a lithium containing solution comprising silica, divalent ions, and borate ions;
   processing the lithium containing solution in a silica management process to produce a silica-lean lithium containing solution;
   processing the silica-lean lithium containing solution in a lithium capture step, the lithium capture step captures lithium from the silica-lean lithium containing solution by contacting the silica-lean lithium containing solution with a sorbent to produce a saturated lithium sorbent material;
   recovering lithium from the lithium capture step to produce the lithium rich stream, wherein recovering lithium from the lithium capture step comprises:
      stripping the saturated lithium sorbent material to produce an eluate;
      recycling at least a portion of the eluate to the sorbent to produce the lithium rich stream, wherein the portion of eluate comprises the highest concentration of lithium;
   purifying the lithium rich stream to remove divalent ions and borate ions;
   concentrating the lithium rich stream by supplying the lithium rich stream to a forward osmosis step to produce a concentrated lithium rich stream; and
   further concentrating the concentrated lithium rich stream to produce a twice concentrated lithium rich stream.

2. The method of claim 1, further comprising pretreating the silica-lean lithium containing solution in an ion exchange to extract lithium from the silica-lean lithium containing solution.

3. A method of claim 1, wherein the sorbent comprises an alumina sorbent.

4. A method of claim 1, further comprising purifying the lithium rich stream by ion exchange to remove calcium, magnesium, and divalent ions.

5. The method of claim 1, wherein the forward osmosis step comprises processing the lithium rich stream in at least one forward osmosis unit comprising:
   at least one lithium containing solution chamber having at least one first inlet and at least one first outlet;
   at least one brine chamber having at least one second inlet and at least one second outlet; and
   at least one selectively permeable membrane positioned between the at least one lithium containing solution chamber and the at least one brine chamber.

6. The method of claim 5, further comprising conveying a lithium rich stream through the at least one lithium containing solution chamber and a concentrated brine solution through the at least one brine chamber, said conveying causing water from the lithium rich stream to be drawn through the at least one selectively permeable membrane and into the concentrated brine solution, such that a concentrated lithium rich stream exits through the first outlet and a less concentrated brine solution exits through the second outlet.

7. The method of claim 1, further comprising purifying the twice concentrated lithium rich stream by removing sodium and potassium ions to produce a concentrated lithium rich solution having reduced sodium and potassium ion concentrations.

8. The method of claim 1, wherein the sorbent is stripped with a low ionic strength liquid.

9. The method of claim 8, wherein the low ionic strength liquid comprises alcohols, water, or mixtures thereof.

* * * * *